United States Patent
Edge et al.

(10) Patent No.: US 11,187,779 B2
(45) Date of Patent: *Nov. 30, 2021

(54) METHOD AND/OR SYSTEM FOR ACQUISITION OF A POSITIONING SIGNAL

(71) Applicant: QUALCOMM Incorporated, San Diego, CA (US)

(72) Inventors: Stephen William Edge, Escondido, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,569

(22) Filed: Apr. 9, 2020

(65) Prior Publication Data
US 2020/0233057 A1 Jul. 23, 2020

Related U.S. Application Data

(63) Continuation of application No. 15/827,855, filed on Nov. 30, 2017, now Pat. No. 10,649,064.
(Continued)

(51) Int. Cl.
*G01S 5/10* (2006.01)
*H04W 4/02* (2018.01)
(Continued)

(52) U.S. Cl.
CPC .............. *G01S 5/10* (2013.01); *G01S 1/20* (2013.01); *G01S 5/0236* (2013.01); *H04W 4/02* (2013.01);
(Continued)

(58) Field of Classification Search
CPC ........ G01S 1/20; G01S 5/0063; G01S 5/0236; G01S 5/10; H04W 4/02; H04W 64/00; H04W 64/003
See application file for complete search history.

(56) References Cited

U.S. PATENT DOCUMENTS 9,661,601 B2  5/2017 Fischer et al.
10,649,064 B2 * 5/2020 Edge ............... G01S 5/0236
(Continued)

FOREIGN PATENT DOCUMENTS

CN    102186191 A    9/2011
CN    102725649 A    10/2012
(Continued)

OTHER PUBLICATIONS

Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.com/s/Qualcomm-OTDOA-positioning-in-LTE-June-2014.pdf, p. 9, chapter 3.1;p. 13, chapter 4.2.1 ;p. 15, chapter 5.1;p. 18, chapter 5.4;pp. 31-33, chapter 6.3;pp. 37-39, chapter 6.5; pp. 40-42, chapters 7.1.1-7.1.3.
(Continued)

*Primary Examiner* — Dao L Phan
(74) *Attorney, Agent, or Firm* — Qualcomm Incorporated

(57) ABSTRACT

Disclosed are methods for aiding a mobile device in the acquisition of positioning reference signals (PRSs) transmitted in a cellular network in support of OTDOA positioning. In one implementation, a mobile device receives an offset parameter from a location server indicative of a difference in timing between transmission of a first PRS positioning occasion for a reference cell and transmission of a second PRS positioning occasion for a neighboring cell that supports multiple PRS configurations, where the second PRS positioning occasion is for a PRS configuration with a longest periodicity. The mobile device may determine an expected timing of PRS positioning occasions for other PRS configurations for the neighboring cell based on the offset parameter and may measure a Reference Signal Time Difference for the neighboring cell using the expected timing.

26 Claims, 12 Drawing Sheets

Related U.S. Application Data

(60) Provisional application No. 62/475,849, filed on Mar. 23, 2017, provisional application No. 62/457,788, filed on Feb. 10, 2017, provisional application No. 62/453,879, filed on Feb. 2, 2017.

(51) Int. Cl.
*H04W 64/00* (2009.01)
*G01S 1/20* (2006.01)
*G01S 5/02* (2010.01)
*G01S 5/00* (2006.01)

(52) U.S. Cl.
CPC ......... *H04W 64/00* (2013.01); *H04W 64/003* (2013.01); *G01S 5/0063* (2013.01)

(56) References Cited

U.S. PATENT DOCUMENTS

| | | |
|---|---|---|
| 2012/0015667 A1 | 1/2012 | Woo et al. |
| 2012/0252487 A1 | 10/2012 | Siomina et al. |
| 2015/0018010 A1 | 1/2015 | Fischer |
| 2015/0141048 A1 | 5/2015 | Woo et al. |
| 2018/0217228 A1 | 8/2018 | Edge et al. |

FOREIGN PATENT DOCUMENTS

| | | |
|---|---|---|
| CN | 103004267 A | 3/2013 |
| CN | 103370633 A | 10/2013 |
| CN | 104521273 A | 4/2015 |
| WO | 2014092945 | 6/2014 |

OTHER PUBLICATIONS

International Search Report and Written Opinion—PCT/US2017/066548—ISA/EPO—dated Mar. 28, 2018.
Taiwan Search Report—TW107100018—TIPO—dated Aug. 5, 2020.

* cited by examiner

US 11,187,779 B2

METHOD AND/OR SYSTEM FOR ACQUISITION OF A POSITIONING SIGNAL

CROSS-REFERENCE TO RELATED APPLICATIONS

This application is a continuation of U.S. patent application Ser. No. 15/827,855, entitled "Method and/or System for Acquisition of a Positioning Signal," filed on Nov. 30, 2017, which claims the benefit of U.S. Provisional Application Nos. 62/453,879, entitled "Method and/or System for Acquisition of a Positioning Signal," filed Feb. 2, 2017, 62/457,788, entitled "Method and/or System for Acquisition of a Positioning Signal," filed Feb. 10, 2017, and 62/475,849, entitled "Method and/or System for Acquisition of a Positioning Signal," filed Mar. 23, 2017, each of which is assigned to the assignee hereof and of which the entire contents are hereby incorporated herein by reference for all purposes.

BACKGROUND

Field

Subject matter disclosed herein relates to estimation of a location of a mobile device using a positioning signal transmitted by a network transceiver or other transmission point.

Information

The location of a mobile device, such as a cellular telephone or smartphone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. However, acquiring a PRS may not be possible without knowledge by a mobile device of the approximate times at which a PRS can be acquired. For example, when a PRS is transmitted during one or more consecutive one millisecond (ms) LTE subframes by a base station, a mobile device may need to know when to expect these subframes with an accuracy better than one ms. Techniques to accurately convey such information to a mobile device may therefore be of use.

SUMMARY

Briefly, one particular implementation is directed to a method, at a mobile device, comprising: receiving a first message from a location server comprising an offset parameter indicative of a difference in timing between transmission of a first Positioning Reference Signal (PRS) positioning occasion from a first eNodeB of a reference cell and transmission of a second PRS positioning occasion from a second eNodeB of a neighboring cell, wherein the second eNodeB transmits a plurality of two or more PRS configurations for the neighboring cell and wherein the second PRS positioning occasion is a PRS positioning occasion for a first PRS configuration for the neighboring cell, wherein the first PRS configuration has a longest periodicity; determining an expected timing of at least a third PRS positioning occasion for a second PRS configuration transmitted by the second eNodeB for the neighboring cell based on the offset parameter; and measuring a Reference Signal Time Difference (RSTD) for the neighboring cell based at least in part on the expected timing.

Another particular implementation is directed to a mobile device, comprising: a transceiver for transmitting messages to and receiving messages from a communication network; and one or more processors configured to: receive a first message at the transceiver from a location server comprising an offset parameter indicative of a difference in timing between transmission of a first Positioning Reference Signal (PRS) positioning occasion from a first eNodeB of a reference cell and transmission of a second PRS positioning occasion from a second eNodeB of a neighboring cell, wherein the second eNodeB transmits a plurality of two or more PRS configurations for the neighboring cell and wherein the second PRS positioning occasion is a PRS positioning occasion for a first PRS configuration for the neighboring cell, where the first PRS configuration has a longest periodicity; determine an expected timing of at least a third PRS positioning occasion for a second PRS configuration transmitted by the second eNodeB for the neighboring cell based on the offset parameter; and measure a Reference Signal Time Difference (RSTD) for the neighboring cell based at least in part on the expected timing.

Another particular implementation is directed to a mobile device, comprising: means for receiving a first message from a location server comprising an offset parameter indicative of a difference in timing between transmission of a first Positioning Reference Signal (PRS) positioning occasion from a first eNodeB of a reference cell and transmission of a second PRS positioning occasion from a second eNodeB of a neighboring cell, wherein the second eNodeB transmits a plurality of two or more PRS configurations for the neighboring cell and wherein the second PRS positioning occasion is a PRS positioning occasion for a first PRS configuration for the neighboring cell, wherein the first PRS configuration has a longest periodicity; means for determining an expected timing of at least a third PRS positioning occasion for a second PRS configuration transmitted by the second eNodeB for the neighboring cell based on the offset parameter; and means for measuring a Reference Signal Time Difference (RSTD) for the neighboring cell based at least in part on the expected timing.

Another particular implementation is directed to a storage medium comprising computer readable instructions stored thereon which are executable by one or more processors of a mobile device to: receive a first message from a location server comprising an offset parameter indicative of a difference in timing between transmission of a first Positioning Reference Signal (PRS) positioning occasion from a first eNodeB of a reference cell and transmission of a second PRS positioning occasion from a second eNodeB of a neighboring cell, wherein the second eNodeB transmits a plurality of two or more PRS configurations for the neighboring cell and wherein the second PRS positioning occasion is a PRS positioning occasion for a first PRS configuration for the neighboring cell, wherein the first PRS configuration has a longest periodicity; determine an expected timing of at least a third PRS positioning occasion for a second PRS configuration transmitted by the second eNodeB for the neighboring cell based on the offset parameter; and measure a Reference Signal Time Difference (RSTD) for the neighboring cell based at least in part on the expected timing.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
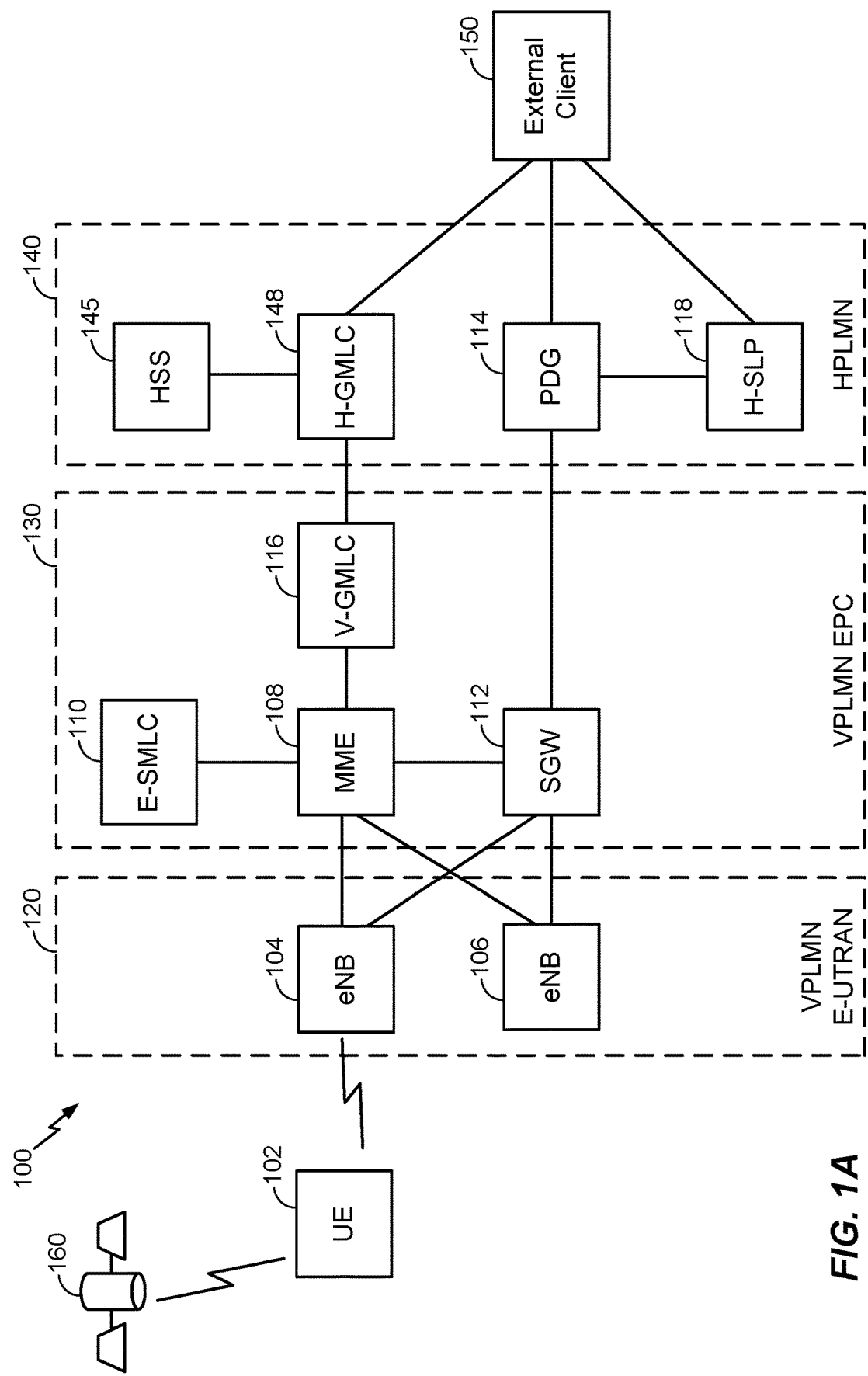
FIGS. 1A and 1B are schematic diagrams of example architectures for terrestrial positioning with 3GPP long term evolution (LTE) access.

Reference is made in the following detailed description to accompanying drawings, which form a part hereof, wherein like numerals may designate like parts or like elements throughout that are identical, similar and/or analogous. In certain cases, a numeric label for a part or element may be followed by a hyphen and a numeric subscript to indicate a particular instance of the part or element. In such a case, reference to the numeric label without a subscript may refer to any instance of the part or element. As an example, there may be specific instances 252-1, 252-2, 252-3 and 252-4 of positioning occasions for a PRS transmitted for a cell. A reference to a positioning occasion 252 may then refer to any of the positioning occasions 252-1, 252-2, 252-3 and 252-4 for the PRS.

It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, left, right and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, one aspect, an aspect, and/or the like mean that a particular feature, structure, characteristic, and/or the like described in relation to a particular implementation, embodiment and/or aspect is included in at least one implementation, embodiment and/or aspect of claimed subject matter. Thus, appearances of such phrases, for example, in various places throughout this specification are not necessarily intended to refer to the same implementation, embodiment and/or aspect or to any one particular implementation, embodiment and/or aspect. Furthermore, it is to be understood that particular features, structures, characteristics, and/or the like described are capable of being combined in various ways in one or more implementations, embodiments, and/or aspects and, therefore, are within intended claim scope. However, these and other issues have a potential to vary in a particular context of usage. In other words, throughout the disclosure, a particular context of description and/or usage provides helpful guidance regarding reasonable inferences to be drawn; however, likewise, "in this context" in general without further qualification refers to the context of the present disclosure.

According to an embodiment, positioning operations performed at a mobile device may employ positioning assistance data for obtaining observations to be used in computing a position fix, for example. In a particular implementation, a mobile device may attempt to obtain a Reference Signal Time Difference (RSTD) measurement based on observations of a positioning reference signal (PRS) transmitted by a transmitter serving a reference cell and a PRS transmitted by a transmitter serving a neighbor cell. A mobile device may obtain positioning assistance data including timing parameters to assist the mobile device in acquiring and measuring each PRS to enable a determination of an RSTD measurement. Assistance data may also be provided to a mobile device to help enable the acquisition and measurement of other PRSs transmitted by transmitters serving other neighbor cells, which may enable a determination by the mobile device of other RSTD measurements. For example, an RSTD measurement may be determined by a mobile device from a first measured time of arrival (TOA) for a PRS transmitted from a transmitter serving a neighbor cell and a second measured time of arrival (TOA) for a PRS transmitted from a transmitter serving a reference cell, where the determined RSTD equals the first TOA minus the second TOA (or the reverse). A mobile device may send one or more determined RSTD measurements to a location server which may compute a location for the mobile device based on the determined RSTD measurements and other information known to the location server such as the antenna locations for the reference cell and neighbor cells (also referred to as neighboring cells) and the relative PRS transmission times for the reference cell and neighbor cells.

Briefly, one embodiment herein is directed to a method at a mobile device (also referred to as a user equipment (UE)) to obtain an offset parameter for use in acquisition of a PRS including receiving a first message from a location server comprising an offset parameter indicative of a difference in timing between transmission of a first PRS positioning occasion from a first eNodeB transmitter serving a reference cell and transmission of a second PRS positioning occasion from a second eNodeB transmitter serving a neighbor cell. In an implementation, the second eNodeB transmitter may transmit PRS positioning occasions according to two or more PRS configurations for the neighbor cell. Also, the second PRS positioning occasion may comprise a PRS positioning occasion for a first PRS configuration for the neighbor cell (among the two or more PRS configurations for the neighbor cell) having a longest periodicity. Based, at least in part, on the offset parameter, the mobile device may determine an expected timing of at least a third PRS positioning occasion for a second PRS configuration transmitted by the second eNodeB transmitter for the neighboring cell. The mobile device may then obtain an RSTD measurement for the neighboring cell based at least in part on the expected timing. The above described embodiment may enable a reduction in transmission of offset parameters in positioning assistance data provided to a mobile device and may thereby enable a reduction in transmission resources for providing positioning assistance data to mobile devices.

FIG. 1A is a diagram illustrating a network architecture 100 for location support of a user equipment (UE) 102 that may support Narrowband Internet of Things (NB-IoT) radio access and/or Long Term Evolution (LTE) radio access. The network architecture 100 may be referred to as an Evolved Packet System (EPS). As illustrated, the network architecture 100 may include UE 102, an Evolved Universal Mobile Telecommunications Service (UMTS) Terrestrial Radio Access Network (E-UTRAN) 120, and an Evolved Packet Core (EPC) 130. The E-UTRAN 120 and the EPC 130 may be part of a Visited Public Land Mobile Network (VPLMN) that is a serving network for UE 102 and communicates with a Home Public Land Mobile Network (HPLMN) 140 for UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the network architecture 100 provides packet-switched services to UE 102. However, as those skilled in the art will readily appreciate, the various concepts presented throughout this disclosure may be extended to networks providing circuit-switched services.

UE 102 may comprise any electronic device configured for NB-IoT and/or LTE radio access. UE 102 may be referred to as a device, a wireless device, a mobile terminal, a terminal, a mobile station (MS), a mobile device, a Secure User Plane Location (SUPL) Enabled Terminal (SET) or by some other name and may correspond to (or be part of) a smart watch, digital glasses, fitness monitor, smart car, smart appliance, cellphone, smartphone, laptop, tablet, PDA, tracking device, control device, Internet of Things (IoT) device, or some other portable or moveable device, just to provide a few examples.

A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), Fifth Generation (5G, also referred to as New Radio (NR)), High Rate Packet Data (HRPD), WiMax, etc. VPLMN EPC 130 combined with VPLMN E-UTRAN 120, and HPLMN 140, may be examples of a WWAN. UE 102 may also support wireless communication with one or more types of Wireless Local Area Network (WLAN) such as a WLAN supporting IEEE 802.11 WiFi or Bluetooth® (BT). UE 102 may also support communication with one or more types of wireline network such as by using a Digital Subscriber Line (DSL) or packet cable for example. Although FIG. 1A shows only one UE 102, there may be many other UEs that can each correspond to UE 102.

UE 102 may enter a connected state with a wireless communication network that may include the E-UTRAN 120. In one example, UE 102 may communicate with a cellular communication network by transmitting wireless signals to, and/or receiving wireless signals from, a cellular transceiver, such as an evolved Node B (eNodeB or eNB) 104 in the E-UTRAN 120. The E-UTRAN 120 may include one or more additional eNBs 106. The eNB 104 provides user plane and control plane protocol terminations toward UE 102. The eNB 104 may be a serving eNB for UE 102 and may also be referred to as a base station, a base transceiver station, a radio base station, a radio transceiver, a radio network controller, a transceiver function, a base station subsystem (BSS), an extended service set (ESS), an NR NodeB (gNB), or by some other suitable terminology. UE 102 also may transmit wireless signals to, or receive wireless signals from, a local transceiver (not shown in FIG. 1A), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network). In some implementations, E-UTRAN 120 may contain positioning only beacons (not shown in FIG. 1A), which transmit signals to UE 102 (e.g. a PRS) but may not receive signals from UE 102. Of course it should be understood that these are merely examples of networks that may communicate with a mobile device over a wireless link, and claimed subject matter is not limited in this respect.

Examples of network technologies that may support wireless communication include GSM, CDMA, WCDMA, LTE, HRPD, eMTC, 5G (or NR). NB-IoT, GSM, WCDMA, LTE, eMTC and 5G (NR) are technologies defined by (or being defined by) the 3rd Generation Partnership Project (3GPP). CDMA and HRPD are technologies defined by the 3rd Generation Partnership Project 2 (3GPP2). WCDMA is also part of the Universal Mobile Telecommunications System (UMTS). Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

eNBs 104 and 106 may be connected by an interface (e.g. the 3GPP S1 interface) to the VPLMN EPC 130. The EPC 130 includes a Mobility Management Entity (MME) 108, and a Serving Gateway (SGW) 112 through which data (e.g. Internet Protocol (IP) packets) to and from UE 102 may be transferred. MME 108 may be a serving MME for UE 102 and may provide a control node that processes signaling between UE 102 and EPC 130, and supports attachment and network connection of UE 102, mobility of UE 102 (e.g. via handover between network cells) as well as establishing and releasing data bearers on behalf of UE 102. MME 108 may also support User Plane (UP) data transfer to and from UE 102 using a 3GPP Cellular IoT (CIoT) feature known as CIoT Control Plane (CP) optimization in which data packets are transferred to and from UE 102 via the MME 108, rather than by bypassing the MME 108, in order to avoid the overhead of establishing and releasing data bearers for UE 102. In an embodiment, MME 108 may provide bearer and connection management for UE 102 and may be connected to SGW 112, eNBs 104 and 106, an Enhanced Serving Mobile Location Center (E-SMLC) 110 and a Visited Gateway Mobile Location Center (V-GMLC) 116 in the VPLMN EPC 130.

E-SMLC 110 may support location of UE 102 using a 3GPP control plane (CP) location solution defined in 3GPP technical specifications (TSs) 23.271 and 36.305. For example, E-SMLC 110 may control and coordinate location procedures to obtain a location for UE 102 and may exchange positioning protocol messages (e.g. LTE Positioning Protocol (LPP) messages, LPP Extensions (LPPe) messages or combined LPP/LPPe messages) with UE 102 (e.g. which may be transferred via MME 108 and eNB 104). LPP is defined in 3GPP TS 36.355 and LPPe is defined by the Open Mobile Alliance (OMA). The exchanged positioning protocol messages may provide assistance data to UE 102 (e.g. assistance data for OTDOA) and/or may transfer location measurements from UE 102 to E-SMLC 110 such as RSTD measurements. V-GMLC 116, which may also be referred to simply as a Gateway Mobile Location Center (GMLC) 116, may provide access on behalf of an external client (e.g. external client 150) or another network (e.g. HPLMN 140) to the location of UE 102. The external client 150 may be a web server or remote application that may have some association with UE 102 (e.g. may be accessed by a user of UE 102 via VPLMN E-UTRAN 120, VPLMN EPC 130 and HPLMN 140) or may comprise a server, application or computer system providing a location service to some other user or users, which may include obtaining and providing the location of UE 102 (e.g. to enable a service such as a friend or relative finder, asset tracking or child or pet location).

As illustrated, HPLMN 140 includes a Home Gateway Mobile Location Center (H-GMLC) 148 that may be connected to V-GMLC 116 (e.g. via the Internet), as well as a Packet Data Network Gateway (PDG) 114 that may be connected to SGW 112 (e.g. via the Internet). PDG 114 may provide UE 102 with Internet Protocol (IP) address allocation and IP and other data access to external networks (e.g. the Internet) and to external clients (e.g. external client 150) and external servers, as well as other data transfer related functions. In some cases, PDG 114 may be located in VPLMN EPC 130 and not in HPLMN 140 when UE 102 receives local IP breakout in VPLMN EPC 130. The PDG 114 may be connected to a location server, such as a Home Secure User Plane Location (SUPL) Location Platform (H-SLP) 118. The H-SLP 118 may support the SUPL UP location solution defined by the Open Mobile Alliance (OMA) and may support location services for UE 102 based on subscription information for UE 102 stored in H-SLP 118. In some embodiments of network architecture 100, a Discovered SLP (D-SLP) or Emergency SLP (E-SLP) (not shown in FIG. 1A), in or accessible from VPLMN EPC 130, may be used to locate UE 102 using a SUPL UP solution, for example.

In a CP location solution, such as the 3GPP CP location solution defined in 3GPP TS 23.271 and TS 36.305, signaling (e.g. including LPP, LPP/LPPe and other messages) to support location of UE 102 may be transferred between participating entities (e.g. V-GMLC 116, MME 108, E-SMLC 110, eNB 104 and UE 102) using existing signaling interfaces and protocols for VPLMN EPC 130 and E-UTRAN 120. In contrast, in a UP location solution such as SUPL, signaling (e.g. such as SUPL messages carrying embedded LPP and/or LPP/LPPe messages) to support location of UE 102 may be transferred between participating entities (e.g. UE 102 and H-SLP 118) using data bearers (e.g. using the Internet Protocol (IP) and/or Transmission Control Protocol (TCP)).

H-GMLC 148 may be connected to a Home Subscriber Server (HSS) 145 for UE 102, which is a central database that contains user-related and subscription-related information for UE 102. H-GMLC 148 may provide location access to UE 102 on behalf of external clients such as external client 150. One or more of H-GMLC 148, PDG 114, and H-SLP 118 may be connected to external client 150, e.g., through another network, such as the Internet. In some cases, a Requesting GMLC (R-GMLC) located in another Public Land Mobile Network (PLMN) (not shown in FIG. 1A) may be connected to H-GMLC 148 (e.g. via the Internet) in order to provide location access to UE 102 on behalf of external clients connected to the R-GMLC. The R-GMLC, H-GMLC 148 and V-GMLC 116 may support location access to UE 102 using the 3GPP CP solution defined in 3GPP TS 23.271.

It should be understood that while a VPLMN (comprising VPLMN E-UTRAN 120 and VPLMN EPC 130) and a separate HPLMN 140 are illustrated in FIG. 1A; both PLMNs (networks) may be the same PLMN. In that case, (i) the H-SLP 118, PDG 114, and HSS 145, will be in the same network (EPC) as MME 108 and E-SMLC 110, and (ii) V-GMLC 116 and H-GMLC 148 may be the same GMLC.

In particular implementations, UE 102 may have circuitry and processing resources capable of obtaining location related measurements (also referred to as location measurements or as measurements), such as measurements for signals received from GPS or other Satellite Positioning System (SPS) space vehicles (SVs) 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to a location server, such as E-SMLC 110 or H-SLP 118, after which the location server may estimate or determine a location for UE 102 based on the measurements.

Location related measurements obtained by UE 102 may include measurements of signals received from SVs 160 belonging to an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers and/or transmission points (TPs)). UE 102 or a separate location server (e.g. E-SMLC 110 or H-SLP 118) may then obtain a location estimate for UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WLAN (also referred to as WiFi), or combinations thereof. In some of these position methods (e.g. AFLT and OTDOA), timing differences (e.g. RSTDs) may be measured by UE 102 relative to three or more terrestrial transmitters fixed at known locations, based at least in part on positioning reference signals (PRS) or other positioning related signals transmitted by the transmitters and received at UE 102. In other position methods (e.g. GNSS or A-GNSS), pseudoranges, code phases and/or carrier phases may be measured by UE 102 relative to four or more SVs with accurately known orbital data, based at least in part, on pilot signals or navigation signals transmitted by the SVs and received at UE 102. In further techniques, combinations of two or more of these position methods may be used.

To support or facilitate these position methods, a location server, such as E-SMLC 110 or H-SLP 118, may be capable of providing positioning assistance data to UE 102 including, for example, information regarding signals to be measured by UE 102 (e.g., expected signal timing, signal coding, signal frequencies, signal Doppler), locations and/or identities of terrestrial transmitters, and/or signal, timing and orbital information for GNSS SVs. Such positioning assistance data may facilitate improvements in signal acquisition and measurement accuracy by UE 102 and/or, in some cases, may enable UE 102 to compute its estimated location based on the signal measurements. For example, a location server may comprise an almanac (e.g. a Base Station Almanac (BSA)) which indicates the locations and identities of cellular transceivers and transmitters (e.g. eNBs 104 and 106) and/or local transceivers and transmitters in a particular region or regions such as a particular venue, and may further contain parameters descriptive of signals transmitted by these transceivers and transmitters such as signal power, signal timing, signal bandwidth, signal coding and/or signal frequency. In the case of ECID, UE 102 may obtain measurements of signal strength (e.g. received signal strength indication (RSSI) or reference signal received power (RSRP)) for signals received from cellular transceivers (e.g., eNBs 104, 106), local transceivers and/or other TPs and/or may obtain a signal to noise ratio (S/N), a reference signal received quality (RSRQ), or a round trip signal propagation time (RTT) between UE 102 and a cellular transceiver (e.g., eNB 104 or 106) or a local transceiver. UE 102 may transfer these measurements to a location server, such as E-SMLC 110 or H-SLP 118, to determine a location for UE 102, or in some implementations, UE 102 may use these measurements together with assistance data (e.g. terrestrial almanac data or GNSS SV data such as GNSS Almanac and/or GNSS Ephemeris information) received from the location server to determine a location for UE 102.

In the case of OTDOA, UE 102 may measure a Reference Signal Time Difference (RSTD) between signals, such as a Positioning Reference Signal (PRS) or Cell-specific Reference Signal (CRS), received from nearby transceivers or base stations (e.g. eNBs 104 and 106). An RSTD measurement may provide a time of arrival difference between signals (e.g. CRS or PRS) received at UE 102 from two different transceivers or TPs (e.g. an RSTD between signals received from eNB 104 and from eNB 106). UE 102 may return the measured RSTDs to a location server (e.g. E-SMLC 110 or H-SLP 118) which may compute an estimated location for UE 102 based on known locations and known signal timing for the measured transceivers or TPs. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS or GNSS receiver at each transceiver or transmitter to accurately obtain the common universal time.

An estimate of a location of UE 102 may be referred to as a location, location estimate, location fix, estimated location, fix, position, position estimate or position fix, and may be geodetic, thereby providing location coordinates for UE 102 (e.g., latitude and longitude) which may or may not include an altitude component (e.g., height above sea level, height above or depth below ground level, floor level or basement level). Alternatively, a location of UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which UE 102 is expected to be located with some given or default probability or confidence level (e.g., 67% or 95%). A location of UE 102 may further comprise an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 102 or by another entity such as eNB 104) that are used to determine (e.g. calculate) a location estimate for UE 102 may be referred to as measurements, location measurements, location related measurements, positioning measurements or position measurements and the act of determining a location for UE 102 may be referred to as positioning of UE 102 or locating UE 102.

Figure 1B:
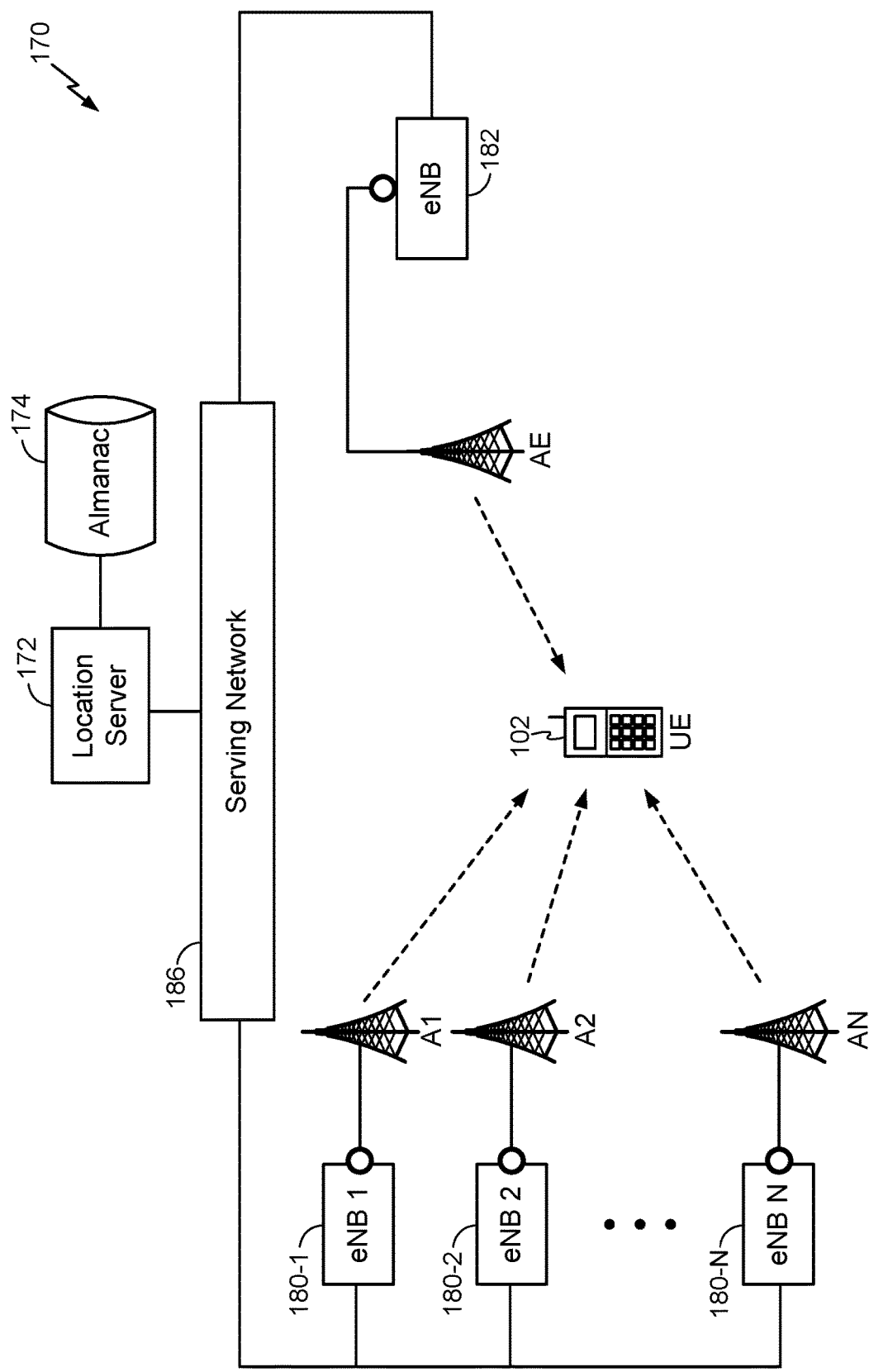

FIG. 1B is a schematic diagram of an example architecture of a wireless communication system 170 according to an embodiment. Wireless communication system 170 may correspond to all or part of network architecture 100 in some embodiments. In one particular implementation, wireless communication system 170 may employ LTE access and synchronized signal transmission (e.g. synchronized PRS transmission). The wireless communication system 170 includes a location server 172 and an almanac 174. Location server 172 and almanac 174 may be included as part of a serving network 186 or may be attached to or reachable from a serving network 186. For example, serving network 186 may correspond to VPLMN EPC 130 in network architecture 100, and location server 172 may correspond to E-SMLC 110 or H-SLP 118 in network architecture 100 or may be another location server such as a Standalone Serving Mobile Location Center (SAS) (not shown) or a Location Management Function (LMF) for 5G access (not shown). Serving network 186 may include one or more access points or base stations such as eNB 1 180-1, eNB 2 180-2, eNB N 180-N, and eNB 182. There may be additional eNBs not explicitly shown in FIG. 1B such as eNBs n 180-$n$ with n between 3 and N−1. Any one of the access points 180 and 182 may correspond to eNB 104 or to eNB 106 in FIG. 1A. Each of the access points may be operably connected to one or more antennas. The antennas comprise A1, A2, . . . AN in the case of eNBs 180-1, 180-2 . . . 180-N, respectively, and AE in the case of eNB 182. Almanac 174 may represent a database structure which may belong to serving network 186 and/or to location server 172 and may, in some embodiments, be part of location server 172 (e.g., contained in a storage medium in location server 172). Almanac 174 may be configured to store identification and location parameters for the access points and base stations (e.g., eNBs 180 and 182) and antennas within serving network 186 and may comprise a BSA of the type previously described here.

With synchronized signal transmission, serving network 186 can employ a set of synchronization points (exemplified by the small circles in FIG. 1B), one for each antenna A1, A2, ..., AN and AE. Each synchronization point may correspond to a location along the signal transmission path for any signal transmitted by one antenna at which the signal timing is synchronized exactly or almost exactly to a common time (e.g., using GPS receivers) that is the same (or almost exactly the same) for all the synchronization points. In the case of LTE, synchronization for each signal can align the start of each new set of 1024 LTE downlink system frames, the start of each 10.0 ms LTE radio frame or just the start of each new 1.0 ms LTE subframe to the same time (e.g. same global time) for each cell and for each radio antenna in each cell if a cell uses multiple radio antennas (e.g., DAS antenna elements or Remote Radio Heads (RRHs)) to broadcast duplicates of the same signal. A synchronization point may correspond to signal transmission at an antenna or to signal propagation past some point prior to reaching the antenna such as a signal output jack from an eNB or an intermediate signal amplifier.

FIG. 1B shows N eNBs 180-1, 180-2, 180-N labelled 1 to N that each support a single cell using a single antenna labelled A1, A2 to AN. An eNB 182 also associated with a single cell is shown that uses an antenna AE. In other implementations, an eNB 180-*n* may support more than one cell (e.g. may support three cell sectors) using different elements of antenna An or using separate antennas.

In particular implementations as discussed below, UE 102 may receive messages from location server 172 comprising positioning assistance data including, for example, identifiers for a plurality of cells (e.g., including cells for each of eNB-1, eNB-2, ..., eNB-N and eNB 182).

According to an embodiment, UE 102 may be capable of obtaining an RSTD measurement by acquisition of a PRS transmitted by an eNB of a reference cell and acquisition of an additional PRS transmitted by an eNB of a neighboring cell. In the presently illustrated embodiment, for example, eNB 182 may serve as an eNB of a reference cell and one of eNBs 180 may serve as an eNB of a neighboring cell.

Figure 2A:
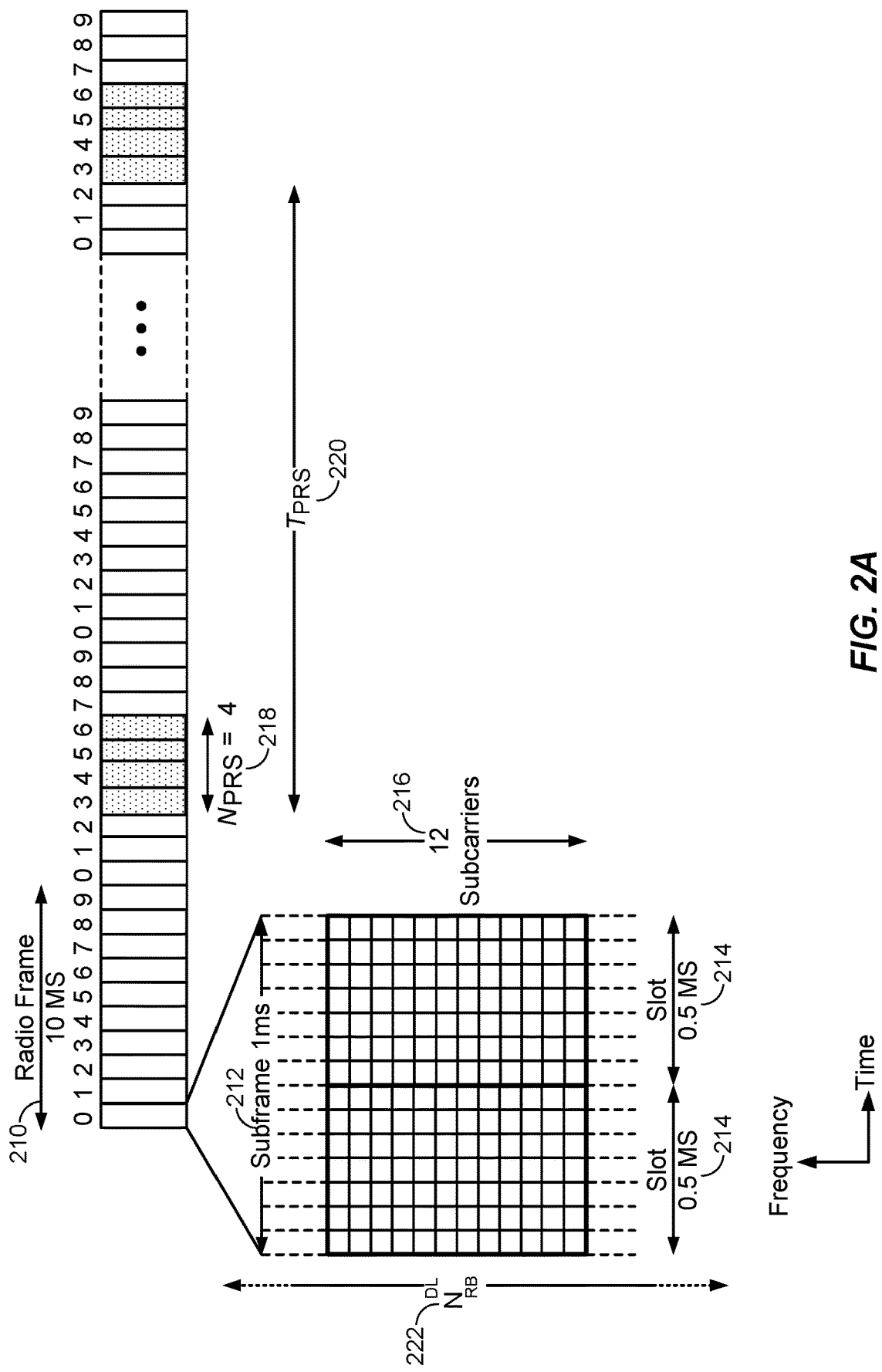
FIGS. 2A and 2B are signal timing diagrams showing features of positioning reference signal (PRS) positioning occasions according to an embodiment.

FIG. 2A shows the structure of an exemplary LTE subframe sequence with PRS positioning occasions (also referred to herein as PRS occasions, wideband (WB) PRS occasions and WB PRS positioning occasions). In FIG. 2A, time is represented horizontally (e.g. on an X axis) with time increasing from left to right, while frequency is represented vertically (e.g. on a Y axis) with frequency increasing (or decreasing) from bottom to top. As shown in FIG. 2A, downlink and uplink LTE Radio Frames 210 are of 10 ms duration each. For downlink Frequency Division Duplex (FDD) mode, Radio Frames 210 are organized into ten subframes 212 of 1 ms duration each. Each subframe 212 comprises two slots 214, each of 0.5 ms duration.

In the frequency domain, an available bandwidth may be divided into uniformly spaced orthogonal subcarriers 216. For example, for a normal length cyclic prefix using 15 KHz spacing, subcarriers 216 may be grouped into a group of 12 subcarriers. Each grouping, which comprises 12 subcarriers 216, in FIG. 2A, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$ 222. For example, for a 3 MHz channel bandwidth in the above example, the number of available resource blocks on each channel 222 is given by $N_{RB}^{DL}=15$. A resource block may comprise 12 subcarriers in the frequency domain (e.g. subcarriers 216 in FIG. 2A) as just mentioned and 6 or 7 symbols in the time domain over one slot (shown horizontally in FIG. 2A). A resource block may comprise a number of resource elements which may each correspond to one symbol within one subcarrier (e.g. as shown by each of the small squares in FIG. 3A for the subframe 212). A PRS subframe may transmit PRS in only some resource elements within a resource block, as defined by a frequency offset. PRS subframes using corresponding resource blocks but with different frequency offsets may transmit PRS in different resource elements for each symbol occurrence in the resource block, thereby avoiding interference when transmitted by different eNBs at the same time and providing orthogonal PRS transmission.

In the network architecture illustrated in FIG. 1A, eNB 104 may transmit a PRS (e.g., a DL PRS) such as the PRS illustrated in FIG. 2A and (as described later) FIG. 2B, which may be measured and used for a UE (e.g. UE 102) position determination. Since transmission of a PRS by an eNB 104 may be directed to all UEs within radio range, eNB 104 may also be considered to broadcast a PRS. An eNB 104 (or eNB 106) that does not support all the normal transceiver functions of an eNB but that transmits (or broadcasts) a PRS signal may be called a terrestrial beacon system (TBS) beacon, a TBS transmission point (TP), a PRS-only TP, a positioning beacon, a positioning only beacon, a PRS only beacon, an eNB beacon, a standalone eNB beacon, or a RAN beacon. In general, a TP, as used herein, refers to all entities in a Radio Access Network (RAN) that transmit PRS to assist in positioning of one or more target UEs and that may or may not support other functions such as providing wireless access (e.g., for voice and data connectivity) to one or more UEs 120. Thus, for example, a TP may correspond to any of eNB 104, eNB 106, eNB 180-1 to 180-N or eNB 182. A TP may also correspond to an eNB that supports a small cell such as a cell providing coverage in a home, office or venue. An eNB supporting a small cell may also be referred to as a femtocell or Home eNB (HeNB).

A PRS, which has been defined in 3GPP Long Term Evolution (LTE) Release-9 and later releases in 3GPP TS 36.211, may be transmitted by TPs after appropriate configuration (e.g. by an O&M server). A PRS may be transmitted in special positioning subframes that are grouped into positioning occasions. In this context, a "PRS positioning occasion" as referred to herein (also referred to as a "PRS occasion") means a portion of a transmitted signal having sufficient energy that is detectable at a receiver such as a receiver of UE 102. For example, in LTE, a PRS positioning occasion may comprise a number $N_{PRS}$ of consecutive positioning subframes where the number $N_{PRS}$ may be between 1 and 160 (e.g. may include the values 1, 2, 4 and 6 as well as other values). PRS positioning occasions for a TP may occur periodically at intervals, denoted by a number $T_{PRS}$, of millisecond (or subframe) intervals where $T_{PRS}$ may equal 5, 10, 20, 40, 80, 160, 320, 640, or 1280. As an example, FIG. 2A illustrates a periodicity of positioning occasions where $N_{PRS}$ 218 equals four and $T_{PRS}$ 220 is greater than or equal to 20. In some embodiments, $T_{PRS}$ may be measured in terms of a number of subframes between the start of consecutive positioning occasions.

Within a positioning occasion, a PRS may be transmitted with a constant power. A PRS may also be transmitted with zero power (e.g., muted). Muting, which turns off a regularly scheduled PRS transmission, may be useful if PRS signals between different cells overlap by occurring at the sane or almost the same time. In this case, a PRS from some cells may be muted while a PRS from other cells are transmitted (e.g. at a constant power). Muting may aid signal acquisition and RSTD measurement by UE 102 for PRS signals that are not muted by avoiding interference from PRS signals that have been muted. Muting may be viewed as the non-transmission of a PRS for a given positioning occasion for a particular cell or TP. Muting patterns may be signaled to UE 102 using bit strings. For example, in a bit string signaling a muting pattern, if a bit at position j is set to "0", then UE 102 may infer that the PRS is muted for a $j^{th}$ positioning occasion.

To further improve acquisition of PRS, positioning subframes may comprise low-interference subframes that are transmitted without user data channels. As a result, in ideally synchronized networks, PRSs may receive interference from other cell PRSs with the same PRS pattern index (e.g., with the same frequency shift), but not from data transmissions. The frequency shift, in LTE, for example, is defined as a function of a PRS ID for a cell or TP (denoted as $N_{ID}^{PRS}$) or as a function of a Physical Cell Identifier (PCI) (denoted as $N_{ID}^{cell}$) if no PRS ID is assigned, and results in an effective frequency re-use factor of six.

To improve acquisition of a PRS further (e.g., if PRS bandwidth is limited such as with only six resource blocks corresponding to 1.4 MHz bandwidth), a frequency band for consecutive PRS positioning occasions (or consecutive PRS subframes) may be changed in a known and predictable manner via frequency hopping. In addition, a TP may support more than one PRS configuration, where each PRS configuration specifies a distinct sequence of PRS positioning occasions with a particular number of subframes ($N_{PRS}$) per positioning occasion and a particular periodicity ($T_{PRS}$) Further enhancements of a PRS may also be supported by a TP and/or eNB.

OTDOA positioning assistance data may be provided to UE 102 by a location server (e.g. E-SMLC 110 or H-SLP 118) for a "reference cell" and one or more "neighbor cells" or "neighboring cells" relative to the "reference cell". For example, the assistance data may provide the center channel frequency of each cell, various PRS configuration parameters (e.g. $N_{PRS}$, $T_{PRS}$, frequency shift, muting sequence, frequency hopping sequence, PRS ID, PRS bandwidth), a physical cell ID, a cell global ID and/or other cell related parameters applicable to OTDOA. OTDOA positioning assistance data may also specify a reference cell and one or more neighbor cells. In the case of an eNB that acts as a positioning only beacon, a neighbor cell or reference cell may correspond to a coverage area for the PRS(s) transmitted by the positioning only beacon.

PRS positioning by UE 102 may be facilitated by including the serving cell for UE 102 in the OTDOA assistance data (e.g., with the reference cell indicated as being the serving cell). OTDOA assistance data may also include "expected RSTD" parameters, which provide UE 102 with indications of RSTD values UE 102 is expected to measure at its current location between a reference cell and each of one or more neighbor cells together with an uncertainty associated with the expected RSTD values. An expected RSTD value together with an uncertainty may define a search window duration for UE 102 within which UE 102 is expected to measure an RSTD value. OTDOA assistance information may also include PRS configuration parameters, which may allow UE 102 to determine timing of a PRS positioning occasion on signals received from various neighbor cells relative to PRS positioning occasions on signals received from a reference cell, and to determine the PRS sequence transmitted from various cells in order to measure a signal Time of Arrival (TOA) or RSTD.

The RSTD for a cell "k" relative to a reference cell "Ref", may be given as ($TOA_k$–$TOA_{Ref}$). TOA measurements for different cells may then be converted to RSTD measurements (e.g. as defined in 3GPP TS 36.214) and sent to the location server (e.g. E-SMLC 110 or H-SLP 118) by a UE 102. Using (i) the RSTD measurements, (ii) the known absolute or relative transmission timing of each cell, and (iii) the known position(s) of eNB or TP physical transmitting antennas for the reference and neighboring cells, a UE 102's position may be determined.

Figure 2B:
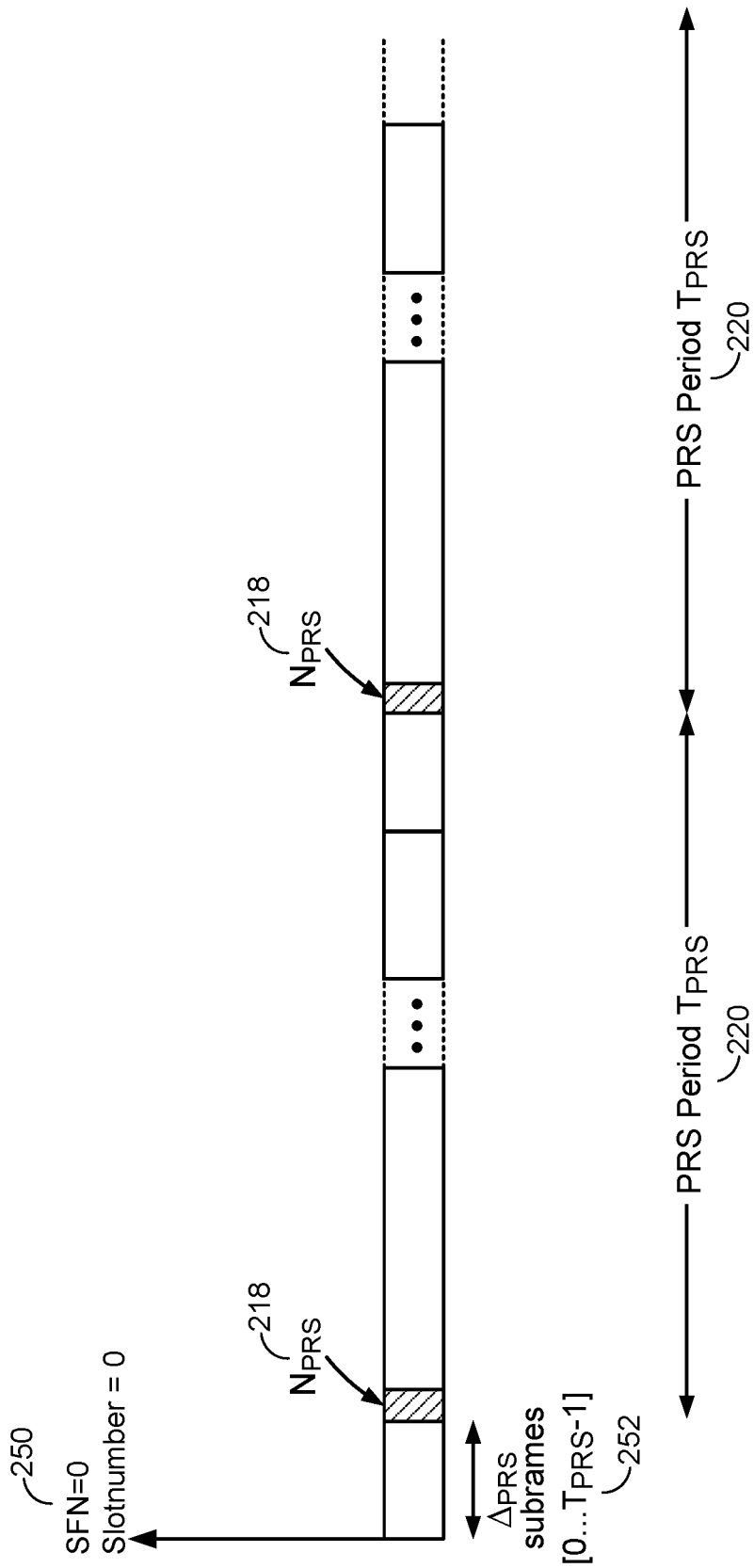

FIG. 2B illustrates further aspects of PRS transmission for a cell supported by an eNB or for a TP for the example shown in FIG. 2A. FIG. 2B shows how PRS positioning occasions may be determined based on a PRS configuration specifying a System Frame Number (SFN), a cell specific subframe offset ($\Delta_{PRS}$) 252 and PRS Periodicity ($T_{PRS}$) 220. In an embodiment, a cell specific PRS subframe configuration may be defined by a "PRS Configuration Index" $I_{PRS}$ included in OTDOA positioning assistance data. PRS Periodicity ($T_{PRS}$) 220 and a cell specific subframe offset ($\Delta_{PRS}$) 252 may be defined based on a PRS Configuration Index $I_{PRS}$, as defined in 3GPP TS 36.211 and as exemplified in Table 1 below.

TABLE 1

| PRS configuration index $I_{PRS}$ | PRS periodicity $T_{PRS}$ (subframes) | PRS subframe offset $\Delta_{PRS}$ (subframes) |
|---|---|---|
| 0–159 | 160 | $I_{PRS}$ |
| 160–479 | 320 | $I_{PRS}$-160 |
| 480–1119 | 640 | $I_{PRS}$-480 |
| 1120–2399 | 1280 | $I_{PRS}$-1120 |
| 2400–2404 | 5 | $I_{PRS}$-2400 |
| 2405–2414 | 10 | $I_{PRS}$-2405 |
| 2415–2434 | 20 | $I_{PRS}$-2415 |
| 2435–2474 | 40 | $I_{PRS}$-2435 |
| 2475–2554 | 80 | $I_{PRS}$-2475 |
| 2555–4095 | Reserved | |

A PRS configuration may be defined, at least in part, with reference to a System Frame Number (SFN) of a cell that transmits PRS. A PRS occurrence for the first subframe of the $N_{PRS}$ downlink subframes comprising a first PRS positioning occasion, may satisfy equation (1) as follows:

$$(10 \times n_f + \lfloor n_s/2 \rfloor - \Delta_{PRS}) \bmod T_{PRS} = 0, \quad (1)$$

where, $n_f$ is the SFN with $0 \le n_f \le 1023$, $n_s$ is a slot number within the radio frame defined by $n_f$ with $0 \le n_s \le 19$, $T_{PRS}$ is the PRS periodicity, and $\Delta_{PRS}$ is the cell-specific subframe offset.

As shown in FIG. 2B, the cell specific subframe offset $\Delta_{PRS}$ 252 (also referred to as the initial subframe offset) may be defined in terms of a number of subframes transmitted starting from event 250 corresponding to transmission of the start of System Frame Number=0, Slot Number=0 to the start of the first (subsequent) PRS positioning occasion. In FIG. 2B, the number of consecutive positioning subframes 218 ($N_{PRS}$) equals 4.

In some embodiments, if a UE (e.g. UE 102) receives a PRS configuration index $I_{PRS}$ in the OTDOA assistance data for a particular cell or TP, the UE may determine a PRS periodicity $T_{PRS}$ and PRS subframe offset $\Delta_{PRS}$ using Table 1. The UE may then determine a radio frame, subframe and slot for which a PRS is scheduled for transmission by an eNB serving a cell (e.g. according to equation (1)). OTDOA positioning assistance data may be determined by a location server (e.g. E-SMLC 110 or H-SLP 118) and may include positioning assistance data for a PRS transmitted by an eNB serving a reference cell, and a number of eNBs serving neighbor cells, wherein any neighbor cell and/or the reference cell may correspond to (e.g. may be supported by) a TP (e.g. such as eNB 104, eNB 106, an eNB 180 or eNB 182).

In an embodiment, PRS positioning occasions for cells in a network that use the same frequency may be aligned in time (e.g. via synchronizing eNB transmissions as in wireless communication system 170) and may be transmitted with a fixed known time offset relative to PRS positioning occasions transmitted for other cells in the network that use some other frequency. In SFN-synchronous networks, eNBs and TPs may be aligned on both an LTE frame boundary and system frame number. Therefore, in SFN-synchronous networks, cells supported by eNBs and TPs may use the same PRS configuration(s) (e.g., may use the same PRS configuration index(es)) for any particular frequency of PRS transmission. On the other hand, in SFN-asynchronous networks, eNBs and TPs may be aligned on a frame boundary, but not necessarily according to a system frame number. Thus, in SFN-asynchronous networks, a PRS configuration index for each cell may be configured separately by the network so that PRS occasions align in time (e.g., according to one or more known offsets). Synchronization of a TP in an SFN-synchronous network (e.g. to align both frame boundaries and SFNs with other cells and TPs) or in an SFN-asynchronous network (e.g., to align frame boundaries with other cells and TPs) may be assisted by an accurate common time reference provided to the TP such as by a GPS or GNSS receiver at each TP.

According to an embodiment, a UE (e.g. UE 102) may determine a timing of PRS occasions transmitted by eNBs or other TPs for a reference cell and neighbor cells for OTDOA positioning if, for example, the UE can obtain the cell timing (e.g., SFN or Frame Number) of at least one of the cells (e.g. the reference cell). The timing of the other cells and TPs may then be derived by the UE, for example based on an assumption that PRS occasions from different cells and TPs overlap or based on provision of a time offset between PRS occasions for at least one of the cells (e.g. the reference cell) and each of the other cells.

In a typical macro-cell scenario, PRS configuration parameters such as the number of consecutive positioning subframes, periodicity, muting pattern, bandwidth, frequency shift, etc. may be configured by the network and may be signaled to a UE (e.g. UE 102) by a location server (e.g. E-SMLC 110 or H-SLP 118) as OTDOA positioning assistance data. For example, E-SMLC 110 may provide OTDOA assistance data to UE 102 whose location is needed. In some embodiments, E-SMLC 110 may provide the OTDOA assistance data to UE 102 using the LPP protocol. For example, E-SMLC 110 may provide the OTDOA assistance data to UE 102 using an LPP Provide Assistance Data message. An LPP Provide Assistance Data message may include OTDOA assistance data such as PRS parameters (e.g. PRS bandwidth, PRS code, frequency shift, muting, PRS subframe configuration) for a reference cell, neighboring cells including TPs that may correspond to the reference cell and/or some or all neighboring cells.

In some embodiments, after providing the OTDOA assistance data, E-SMLC 110 may further send an LPP Request Location Information message to UE 102. In some embodiments, an LPP Request Location Information message may be used to request RSTD measurements from UE 102. For example, for a UE assisted mode of OTDOA positioning, UE location determination by E-SMLC 110 may be based, in part, on RSTD measurements obtained by, and sent to E-SMLC 110 by, UE 102. In some embodiments, an LPP Request Location Information message may include: information elements such as the type of location information desired; a desired accuracy for any location estimates or measurements; a maximum response time and/or the location determination method (e.g. OTDOA) to be used.

In some embodiments, a UE 102 may obtain RSTD measurements requested by E-SMLC 110 using positioning assistance data provided by E-SMLC 110 (e.g. in an earlier LPP Provide Assistance Data message from E-SMLC 110). Further, UE 102 may, within the specified maximum response time, send the obtained RSTD measurements in an LPP Provide Location Information message to E-SMLC 110. An LPP Provide Location Information message may include information elements such as one or more of: RSTD measurements, quality metrics associated with the RSTD measurements, an identity of the reference cell (or reference TP) used for measuring the RSTDs, a quality metric related to TOA measurements for the reference cell (or reference TP), and a neighbor cell measurement list including identities of the measured neighbor cells, and/or measured TPs, for which RSTD measurements are provided.

Based, at least in part, on measurements received from UE 102 in an LPP Provide Location Information message, E-SMLC 110 may determine an estimated location of UE 102 and provide the estimated location to MME 108, which may relay the estimated location to External Client 150 through V-GMLC 116 and optionally H-GMLC 148.

For eMTC access by a UE 102, a cell (e.g. a cell supported by eNB 104 or eNB 106) may support multiple (e.g. up to three) separate PRS configurations for OTDOA. A PRS transmitted for a cell according to a particular PRS configuration may, for example, be transmitted using a different bandwidth, a different frequency shift (e.g., a different set of LTE resource elements in each resource block) and/or a different PRS positioning periodicity than PRS positioning occasions transmitted according to other PRS configurations for the cell. In addition, a particular PRS configuration for eMTC may specify frequency hopping for PRS positioning occasions using a fixed number (e.g. 2 or 4) of different 1.4 MHz narrow band frequencies (referred to herein as narrowbands) in the case of a PRS bandwidth of 1.4 MHz. Different PRS configurations for the same cell may then also use different (or the same) frequency hopping sequences.

For different cells (or TPs) that use the same LTE carrier frequency, PRS positioning occasions may occur at precisely (or almost precisely) the same time. This may allow a UE 102 to determine when PRS positioning occasions are to occur for a neighbor cell (or neighbor TP) based on a known timing of PRS positioning occasions for the reference cell (e.g. when the reference cell and neighbor cell use the same carrier frequency). However, for a neighbor cell (or TP) using a different LTE carrier frequency than the reference cell (or TP), the PRS positioning occasions for the neighbor cell (or TP) may occur at different times to those for the reference cell (or TP).

To assist a UE 102 in acquisition of PRS occasions in the case of one PRS configuration per cell (e.g. as in the case of OTDOA defined in 3GPP TS 36.355 for 3GPP Release 13) and without frequency hopping, an E-SMLC 110 may provide UE 102 with a "subframe offset" (SFO) (also referred to as a "PRS subframe offset" (PRS SFO) and as an "offset value") equal to the subframe difference between a start of a first PRS positioning occasion after System Frame Number (SFN) zero for a reference cell and a start of an immediately following PRS positioning occasion for a neighbor cell. UE 102 may use the subframe offset to determine times that PRS positioning occasions are to be transmitted from the neighbor cell (e.g. which may not be directly visible to UE 102) relative to transmission of PRS positioning occasions transmitted from the reference cell (e.g. which may be directly visible to UE 102). E-SMLC 110 may further provide UE 102 with an approximate expected RSTD that UE 102 is expected to measure between the reference cell and the neighbor cell (e.g. based on a known approximate location of UE 102) and an uncertainty indication for the expected RSTD. The expected RSTD may be a fraction of (e.g. modulo) one ms subframe interval whereas the subframe offset may be in units of one ms subframe intervals. The UE 102 may then combine the subframe offset with the expected RSTD and expected RSTD uncertainty indication to determine a window of time during which a PRS positioning occasion from the neighbor cell is expected to be received at UE 102 and during which UE 102 may measure a time of arrival (TOA) of the PRS positioning occasion and thereby determine an RSTD measurement. However, this method may not, by itself, enable UE 102 to efficiently acquire PRS positioning occasions if there are multiple (e.g. up to three) PRS configurations for a neighbor cell that use frequency hopping. Specific scenarios for this case are outlined below.

In a first scenario, a neighboring cell may use frequency hopping. UE 102 may then need to know not only when each PRS positioning occasion for the neighboring cell will occur (e.g., relative to the first PRS positioning occasion for a reference cell) but also which frequency will be used. This scenario might be supported by providing UE 102 with a subframe offset to a PRS positioning occasion for the neighboring cell that follows a known (e.g. first) PRS positioning occasion for a reference cell, where the PRS positioning occasion for the neighbor cell also has a known frequency (e.g. the center frequency). For example, the PRS positioning occasion for the neighbor cell with the known frequency may be the first such PRS positioning occasion which immediately follows the known (e.g. first) PRS positioning occasion for the reference cell. Since frequency hopping can typically occur in a fixed cyclic order, UE 102 can then determine the timing of other PRS positioning occasions for the neighboring cell that have the same or other frequencies.

In a second scenario, frequency hopping may be used over a number M (e.g. M=2 or 4) of different narrowbands. In this scenario, the periodicity of PRS positioning occasions in the same band may be multiplied by M because the same band may only occur once in each sequence of M consecutive PRS positioning occasions. A normal maximum periodicity of PRS positioning occasions without frequency hopping (e.g. for 3GPP Release 13) may be 1280 subframes but, due to frequency hopping, the effective maximum may be increased to M*1280 subframes (e.g. 5120 subframes if M=4). However, a parameter in the LPP protocol that provides the subframe offset (SFO) to a UE 102 may only have a value range of 0-1279. It may thus not always be possible (using the current LPP SFO parameter) to specify the PRS subframe offset for a neighbor cell configuration (e.g. when frequency hopping is used and the periodicity $T_{PRS}$ between consecutive PRS positioning occasions is 1280 or possibly 640) using a known (e.g. center) frequency PRS occasion.

In a third scenario, a PRS subframe offset (SFO) may always be provided (e.g. using the LPP protocol) to a UE 102 for one specific (e.g. the first) PRS configuration for a neighbor cell. However, the SFO for other configurations for the neighbor cell may not be capable of being determined by UE 102 if their periodicity is larger than (i.e. a multiple of) the periodicity of the provided specific configuration.

Figure 3A:
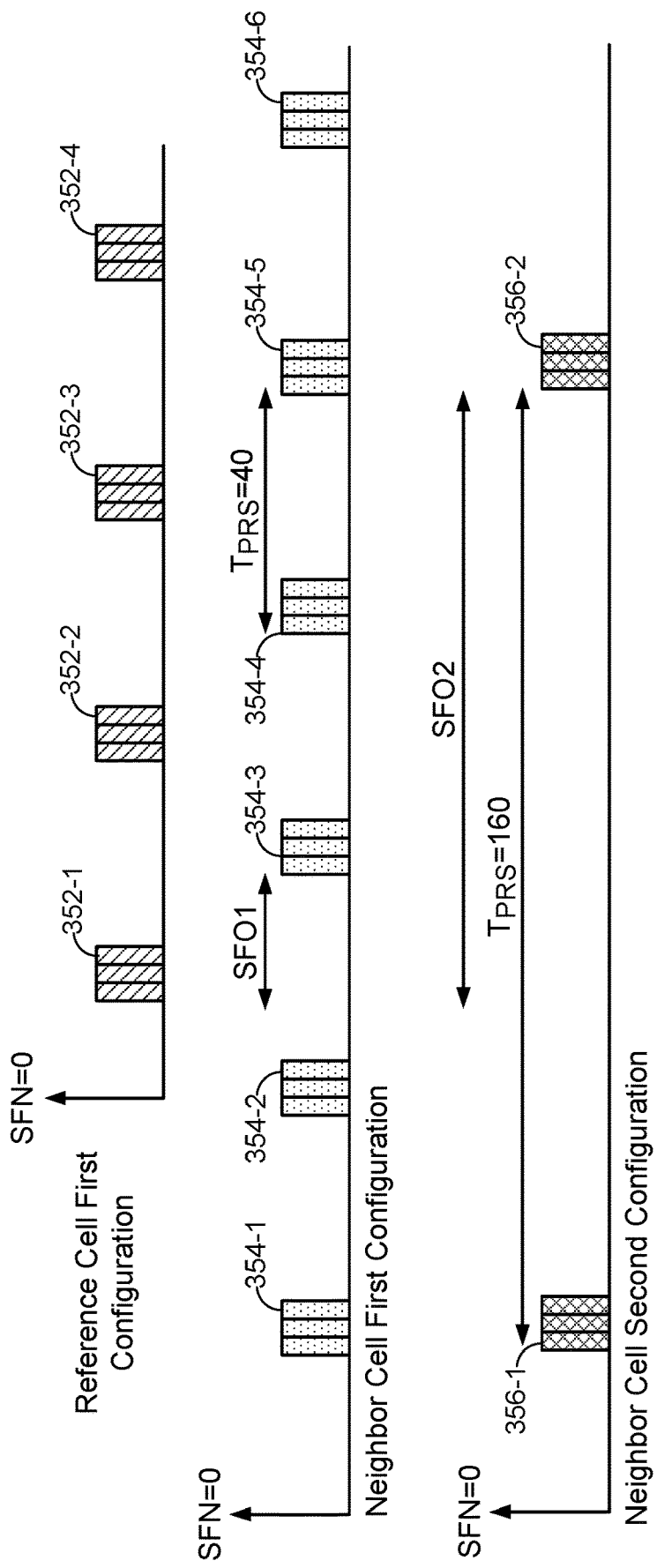
FIGS. 3A through 3C are timing diagrams illustrating a timing of positioning occasions transmitted by transmitters for a reference cell and a neighboring cell according to an embodiment.

FIG. 3A shows one example of the third scenario where a neighbor cell uses a different frequency band to a reference cell. The neighbor cell has two PRS configurations based on a common LTE subframe timing for the neighbor cell which is different (in this example) to the subframe timing for the reference cell. For example, the reference cell and neighbor cell may or may not be synchronized with respect to subframe boundaries, but are not (in this example) synchronized with respect to subframe numbers. An SFO (SFO1) is provided by a location server (e.g. E-SMLC 110) to UE 102 for the first PRS configuration for the neighbor cell comprising PRS positioning occasions 354 which have a periodicity of 40 subframes. In FIG. 3A, SFO1 is provided relative to the first PRS positioning occasion 352-1 for a reference cell. Further, the second PRS configuration for the neighbor cell in FIG. 3A comprises PRS positioning occasions 356 with a periodicity of 160 subframes. In FIG. 3A, SFO1 may be in the range 0-39 subframes. However, a subframe offset SFO2 for the second PRS configuration may be in the range 0-159 subframes and may be equal to any one of SFO1, SFO1+40, SFO1+80 or SFO1+120 subframes, meaning UE 102 cannot unambiguously determine SFO2. It is noted that while FIG. 3A implies that SFO2 equals SFO1+80 subframes, this may be purely due to the drawing shown in FIG. 3A with other examples being possible where SFO2 equals SFO1, SFO1+40 or SFO1+120 subframes.

In a fourth scenario, also illustrated by FIG. 3A, frequency hopping is used for a neighbor cell and resolving the ambiguity of the SFO (e.g. SFO2 in FIG. 3A) for the third scenario may take account of the longer periodicity of PRS positioning occasions caused by the frequency hopping. For example, if the second PRS configuration comprising PRS positioning occasions 356 in FIG. 3A uses frequency hopping over two narrowbands, SFO2 as defined to the next PRS positioning occasion for the second PRS configuration for the center band may have possible values of SFO1, SFO1+40, SFO1+80, SFO1+120, SFO1+160, SFO1+200. SFO1+240 or SFO1+280 subframes.

According to an embodiment, the first and second scenarios above may be addressed by providing to UE 102 by E-SMLC 110 an SFO to the next PRS positioning occasion for a neighbor cell regardless of a particular frequency band in which the PRS is transmitted. As an example, a new SFO may effectively extend an existing SFO range from 0-1279 to 0-5119 subframes in the case of frequency hopping over four narrowbands. This may be enabled by also providing to UE 102 by E-SMLC 110 the frequency band (e.g. using a narrowband indicator) for the next PRS positioning occasion as well as the SFO.

According to an embodiment, the third scenario above may be addressed by providing an SFO for a neighbor cell PRS configuration to UE 102 by a location server (e.g. E-SMLC 110), where the PRS configuration has a longest periodicity (or is the first PRS configuration with a longest periodicity provided to UE 102 in an LPP message if there is more than one PRS configuration with equal longest periodicity). In the example shown in FIG. 3A, SFO2 may then be provided to UE 102 by E-SMLC 110 instead of SFO1. According to an embodiment, the fourth scenario above may be solved by the combined solutions described above for the first and third scenarios above.

Other methods of addressing the four scenarios above may be less efficient or less flexible. For example, with one alternative solution, an SFO may be provided for each separate PRS configuration for a neighbor cell but this may still need to address the first, second and third scenarios above (e.g. using an extra narrowband indicator) and may be less efficient.

Another solution for the four scenarios above may include providing an "SFN zero offset" between a start of system frame number (SFN) zero for a reference cell and the start of SFN zero for a neighbor cell. However, this may add at least one bit to OTDOA assistance data for each cell in LPP and may restrict options for PRS synchronization because the SFN zero offset may have a restricted range. For example, restriction of PRS synchronization may occur since an E-UTRAN (e.g. E-UTRAN 120) may need to synchronize cells relative to SFN zero boundaries. In contrast, when an SFO is provided relative to PRS positioning occasions (and not relative to the start of SFN zero), the number of subframes between SFN zero boundaries for different cells (e.g. a reference cell and neighbor cell) need not be restricted.

According to an embodiment, as shown in FIG. 3A, a UE 102 may determine an expected timing of PRS positioning occasions of a PRS transmitted by a neighbor cell eNodeB transmitter based, at least in part, on a difference in timing between transmission of a first PRS positioning occasion from an eNodeB transmitter of a reference cell and transmission of a second PRS positioning occasion from the neighbor cell eNodeB transmitter. Here, the neighbor cell eNodeB transmitter transmits PRS positioning occasions using two or more PRS configurations and the second PRS positioning occasion comprises a PRS positioning occasion transmitted according to the PRS configuration among the two or more PRS configurations identified as having a longest periodicity between consecutive PRS positioning occasions. For example, the first PRS positioning occasion may be PRS positioning occasion 352-1 in FIG. 3A and the second PRS positioning occasion may be PRS positioning occasion 356-2 in FIG. 3A. As described below, UE 102 may then determine timing of PRS positioning occasions for the neighbor cell transmitted according to PRS configurations other than the PRS configuration identified as having the longest periodicity between consecutive PRS positioning occasions.

In the example in FIG. 3A, the eNB transmitter for the reference cell may be eNB 104 or eNB 182, and the eNB transmitter for the neighbor cell may eNB 106 or any eNB 180 (e.g. eNB 180-1). The two PRS configurations for the neighbor cell comprise a first PRS configuration comprising PRS occasions 354 and a second PRS configuration comprising PRS occasions 356. As may be observed, transmission of PRS occasions 352 by the eNB transmitter of the reference cell is not synchronized with transmission of PRS occasions 354 (according to the first PRS configuration of the eNB of the neighbor cell) or transmission of PRS occasions 356 (according to the second PRS configuration of the eNB of the neighbor cell). As shown, transmission of at least an initial PRS occasion 352-1 is offset from transmission of PRS occasion 354-3 by a value SFO1. Similarly, transmission of at least the initial PRS occasion 352-1 is offset from transmission of PRS occasion 356-2 by a value SFO2. As explained below, UE 102 may adjust its PRS search window to acquire PRS occasions 354 and 356 using only one offset value, and need not obtain both offset values SFO1 and SFO2 in assistance data.

As may be observed in FIG. 3A, PRS occasions 354 are transmitted with a periodicity of $T_{PRS}$=40 ms (equivalent to 40 LTE subframes), while PRS occasions 356 are transmitted with a periodicity of $T_{PRS}$=160 ms (equivalent to 160 LTE subframes). According to an embodiment, PRS positioning occasions 354 and 356 may be transmitted as part of the same carrier frequency. PRS positioning occasions 356, transmitted with the longer periodicity $T_{PRS}$=160 ms, are each transmitted synchronously with transmission of a particular PRS positioning occasion 354. For example, PRS positioning occasion 356-1 is transmitted synchronously with (e.g., at the same time as) transmission of PRS positioning occasion 354-1 and PRS positioning occasion 356-2 is transmitted synchronously with transmission of PRS positioning occasion 354-5.

As may be observed, UE 102 may determine the timing of transmission of PRS positioning occasions 354 relative to a reference time (e.g., transmission of a PRS positioning occasion 352 from the eNB transmitter of the reference cell) based on a single offset value SFO2 and without offset value SFO1. That is, UE 102 may determine SFO1 based on SFO2. For example, as may be observed from FIG. 3A, a transmission time of PRS positioning occasion 356-2 may be determined relative to a transmission time of PRS positioning occasion 352-1 based on offset value SFO2. As pointed out above, transmission of PRS positioning occasion 356-2 is synchronous with transmission of PRS positioning occasion 354-5, enabling determination of a transmission time of PRS occasion 354-5 as being the transmission time of PRS positioning occasion 352-1 offset by offset value SFO2. UE 102 may then determine transmission times of remaining PRS positioning occasions 354 as the transmission time of PRS positioning occasion 354-5 offset by integer multiples of the periodicity (40 ms in this example) of PRS positioning occasions 354. This type of determination may not be possible if E-SMLC 110 were to provide UE 102 with SFO1 instead of SFO2 due to an ambiguity in determining SFO2 from SFO1 as described above.

For an implementation of UE 102 having a narrowband Internet of Things (NB-IoT) radio access capability as defined in 3GPP TS 36.300 and TS 36.311, one or more separate PRS configurations may be provided by a network for each cell. In this context, a wideband (WB) cell may support wideband LTE access with a bandwidth of 1.4, 3.0, 5.0, 10.0, 15.0 or 20.0 MHz, and may include one or more narrowband (NB) carriers with a bandwidth of 200 KHz each (or 180 KHz of usable bandwidth) that is taken from a total bandwidth allocated for the WB cell. Each NB carrier may support (e.g. may correspond to) an NB cell that is associated with the WB cell but that may have a separate identity (e.g., a separate physical and/or global cell ID). Each NB cell (also referred to as an NB carrier) may transmit a PRS positioning occasion in one or more subframes that is referred to as Narrowband PRS (NPRS). An NPRS may comprise the same or similar signal characteristics as a WB PRS (e.g. may be defined the same as or similarly to a WB PRS in 3GPP TS 36.211) but may be limited to a single resource block (RB) (providing 200 KHz of bandwidth). An NB cell (or NB carrier) that transmits an NPRS may be referred to as an NPRS carrier.

According to an embodiment, an NB cell may include NPRS subframes arranged into NPRS positioning occasions defined to be "Type A" or "Type B". A Type A NPRS positioning occasion may comprise a sequence of N=10 or N=40 consecutive subframes starting in an LTE radio frame having a system frame number (SFN) X satisfying the equation X mod N/10=0. N consecutive LTE subframes may transmit NPRS according to an N-bit bitmap where a bit value of one may indicate NPRS is transmitted and a bit value of zero may indicate NPRS is not transmitted. A Type B NPRS positioning occasion may be similar to a WB PRS positioning occasion as described above in association with FIGS. 2A and 2B.

To support OTDOA for UE 102 supporting NB-IoT access, a location server (e.g. E-SMLC 110 or H-SLP 118) may provide assistance data for a reference cell and neighbor cells, where each cell may comprise (a) a WB cell with no associated NB cells, (b) a set of associated NB cells with no associated WB cell, or (c) a WB cell with one or more associated NB cells. For alternatives (a) and (c), one or more PRS configurations may be provided for the WB cell as previously described. For alternatives (b) and (c), a separate NPRS configuration may be provided for each of (or for some of) the associated NB cells. In order to provide information on timing for the NPRS positioning occasions for a particular neighbor cell, a location server (e.g. E-SMLC 110 or H-SLP 118) may provide in positioning assistance data one or more parameters indicative of a subframe offset (SFO) between (i) a first NPRS subframe following the start of the radio frame with SFN zero for one of the NB carriers (e.g. a first NB carrier or an anchor NB carrier) for the reference cell and (ii) a first NPRS subframe in the immediately following NPRS positioning occasion for the particular neighbor cell. To avoid providing an SFO for each NB cell associated with a particular neighbor cell, the server may just provide an SFO for the NB carrier (or NB cell) for the neighbor cell which has the longest periodicity (also referred to as an NPRS periodicity) between consecutive NPRS positioning occasions.

Figure 3B:
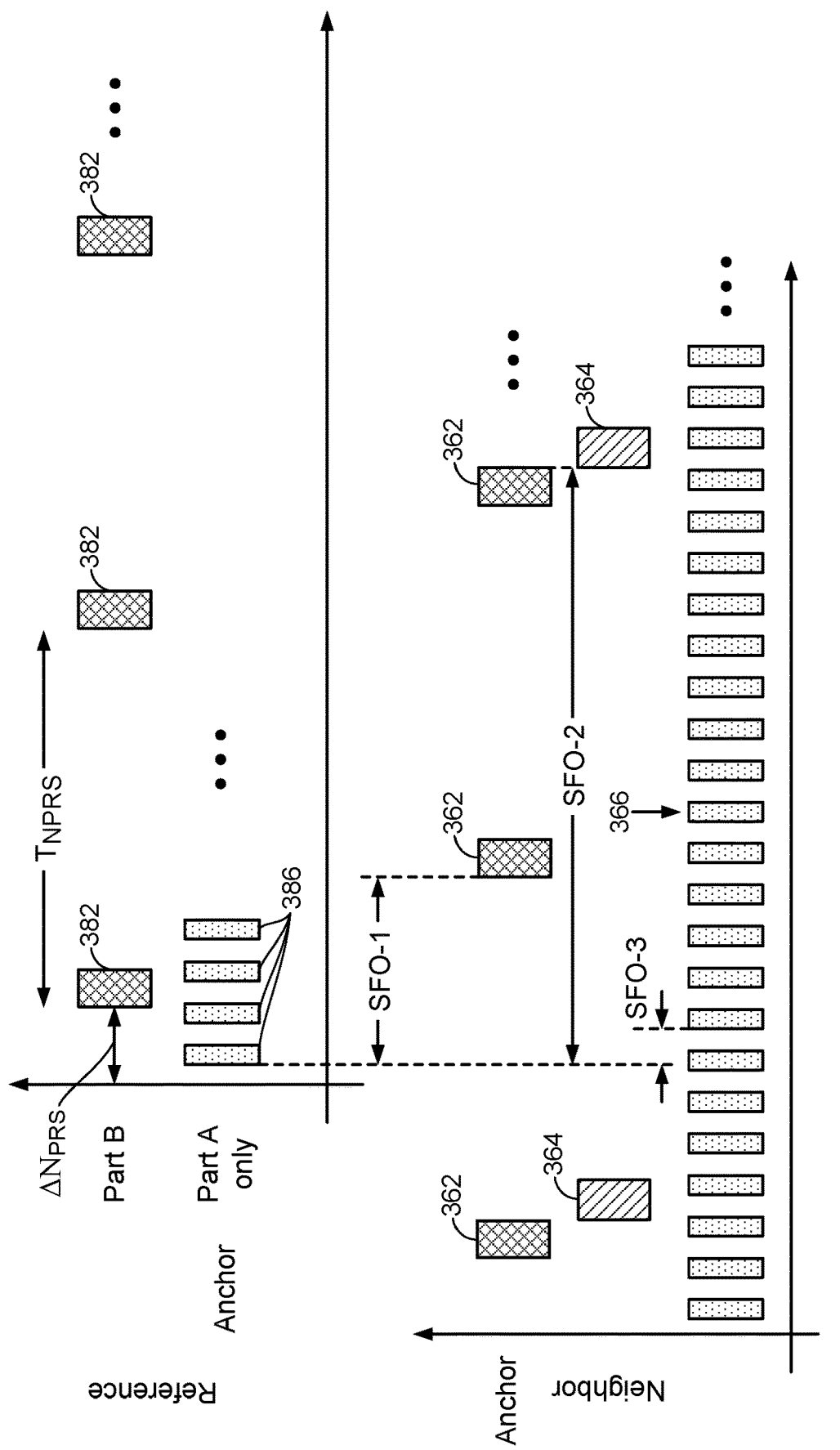

FIG. 3B is a timing diagram showing the timing of transmission of NPRS positioning occasions from an eNB transmitter of an NB reference cell (e.g., eNB 182 or eNB 104) and an eNB transmitter of an NB neighbor cell (e.g., eNB 180-1 or eNB 106) to be acquired at UE 102. For the NB reference cell, NPRS positioning occasions 386 are transmitted according to a Part A NPRS configuration, and NPRS positioning occasions 382 are transmitted according to a Part B NPRS configuration. In one example, the Part A NPRS configuration may be specified for a transmitter of the reference NB anchor cell and the part B NPRS configuration may be specified for a transmitter for an associated NB cell. For the neighbor cell, NPRS positioning occasions 362, 364 and 366 may be transmitted according to three NPRS configurations for three separate NB cells (or NB carriers) associated with the neighbor cell. NPRS positioning occasions 362 and 364 may be transmitted according to Type B NPRS configurations and NPRS positioning occasions 366 may be transmitted according to a Type A NPRS configuration.

For FIG. 3B, a location server (e.g. E-SMLC 110 or H-SLP 118) may provide a subframe offset for the NPRS configuration for the neighbor cell (also referred to as an NPRS carrier when NPRS is supported) which has a longest periodicity between (consecutive) NPRS positioning occasions (or is the NPRS configuration for the first NPRS carrier with a longest periodicity between NPRS positioning occasions provided to UE 102 in an LPP message if there is more than one NPRS configuration with equal longest periodicity). In the example of FIG. 3B, the periodicities may be 160 ms for NPRS positioning occasions 362, 320 ms for NPRS positioning occasions 364 and 10 ms for NPRS positioning occasions 366. A subframe offset SFO-2 may then be provided by the location server for NPRS positioning occasions 364 which have the longest periodicity of 320 ms. UE 102 may then use SFO-2 to determine a subframe offset SFO-1 for NPRS positioning occasions 362 with periodicity 160 ms, and a subframe offset SFO-3 for NPRS positioning occasions 366 with periodicity 10 ms. The subframe offsets SFO-1 and SFO-3 may be determined by UE 102 based on the periodicity and the initial subframe offset for each PRS configuration which may be provided to UE 102 by the location server (e.g. using a PRS configuration index $I_{PRS}$ as described previously) and based on synchronization of the WB cell and/or associated NB cells for the neighbor cell. Providing SFO-2 for the NPRS positioning occasions 364 which have the longest periodicity may avoid ambiguity in determining SFO-1 and SFO-3 as described previously.

As pointed out above, some PRS configurations at an eNB transmitter may specify frequency hopping. For example, a PRS configuration may specify a set of narrowband frequencies at which PRS positioning occasions are to be transmitted. In an embodiment, such a PRS configuration may specify that transmission of PRS positioning occasions are to be transmitted in different narrowband frequencies in a set of narrowband frequencies in a particular cyclic (cycled) sequence in which a PRS positioning occasion is transmitted exactly once in each narrowband frequency in the set in each cycle of the sequence. In this context, a "PRS occasion group", as referred to herein, means a sequence of consecutive PRS positioning occasions transmitted by a transmitter according to a PRS configuration, where the number N of consecutive PRS positioning occasions is fixed and provided to UE 102 by a location server (e.g. E-SMLC 110 or H-SLP 118). In some implementations, a PRS occasion group includes exactly one PRS positioning occasion transmitted for each narrowband frequency in a set of narrowband frequencies specified for the PRS configuration. In some implementations, for a PRS configuration that does not specify frequency hopping (e.g. where the PRS configuration includes PRS positioning occasions for a single narrowband or WB frequency only), a PRS occasion group may comprise a single PRS positioning occasion. In some implementations, for a PRS configuration specifying frequency hopping between two narrowband frequencies, a PRS occasion group may comprise two consecutively transmitted PRS positioning occasions (one PRS positioning occasion transmitted at each of the two narrowband frequencies). In some implementations, for a PRS configuration specifying frequency hopping between four narrowband frequencies, an associated PRS occasion group may comprise four consecutively transmitted PRS positioning occasions (one PRS positioning occasion transmitted at each of the four narrowband frequencies).

In some embodiments, PRS occasion groups may be supported by a UE 102 and a location server (e.g. E-SMLC 110 or H-SLP 118). For example, PRS occasion groups may be implemented if a PRS is transmitted by an eNB 104 or eNB 106 in a cell that supports wideband LTE or LTE for eMTC. As pointed out above, a PRS occasion group may comprise a number N of consecutive PRS positioning occasions. Particular PRS configurations may specify transmission of repeating PRS occasion groups. For example, an initial N PRS positioning occasions following SFN zero for a PRS configuration may comprise an initial PRS occasion group for this PRS configuration. The next N PRS positioning occasions (following the initial N PRS positioning occasions) for the PRS configuration may comprise a second PRS occasion group for this PRS configuration and so on. In some embodiments, the number N of PRS positioning occasions may comprise an integer power of two (e.g., N may be equal to 1, 2, 4, 8 etc.) and may be referred to a "PRS occasion group length." A "PRS occasion group periodicity" for a PRS occasion group may then equal a PRS occasion group length (i.e., N) of the PRS occasion group multiplied by the periodicity of the constituent PRS positioning occasions (e.g. $T_{PRS}$).

In an embodiment in which PRS occasion groups are implemented, a PRS subframe offset (e.g. which may be provided as a parameter for the LPP protocol and may be provided as an integer number of subframes) in positioning assistance data may specify an offset between: (i) a first PRS subframe of a first PRS configuration for transmission of PRS positioning occasions by an eNB transmitter of a reference cell on a reference carrier frequency layer; and (ii) a first PRS subframe in a closest (or soonest) subsequent PRS occasion group of a first PRS configuration for transmission of PRS positioning occasions by an eNB transmitter of a neighbor cell on a different carrier frequency layer. Here, the first PRS subframe transmitted according to the first PRS configuration for transmission of PRS positioning occasions by the eNB transmitter of the reference cell may be a first PRS subframe for the first PRS configuration following a start of system frame number zero for the reference cell in some embodiments. The first PRS subframe of the first PRS configuration for transmission of PRS positioning occasions by the eNB transmitter of the reference cell may also or instead be a first PRS subframe for a PRS occasion group for the first PRS configuration in some embodiments. The first PRS subframe of the first PRS configuration for transmission of PRS positioning occasions by the eNB transmitter of the reference cell may further be a first PRS subframe for the first PRS occasion group for the first PRS configuration in some embodiments.

Figure 3C:
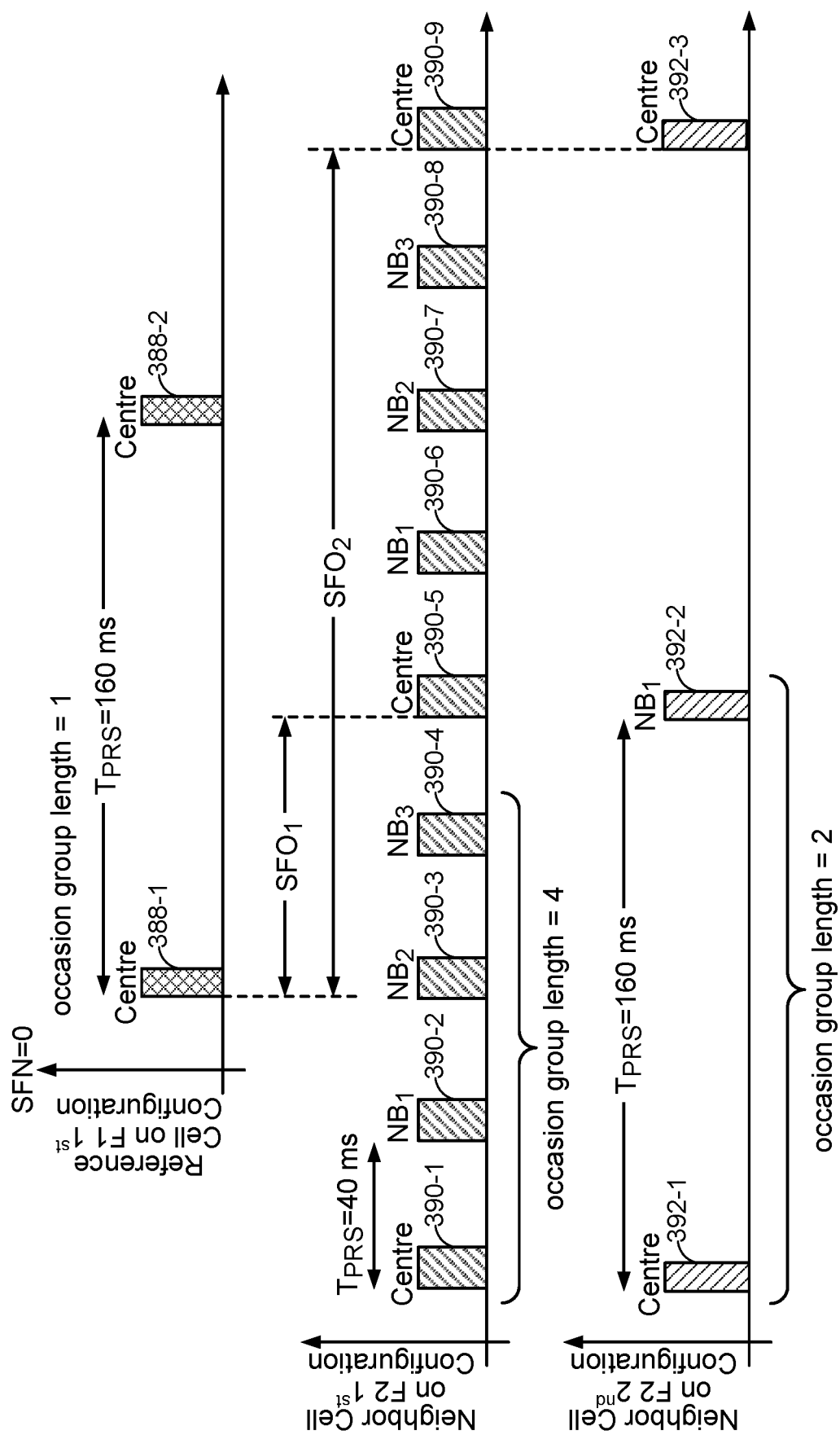

FIG. 3C illustrates PRS subframe offsets according to an embodiment in which PRS occasion groups are supported by UE 102 and a location server (e.g. E-SMLC 110 or H-SLP 118). As illustrated in FIG. 3C, an eNB transmitter (e.g. eNB 104 or eNB 182) of a reference cell on a frequency layer F1 may transmit PRS positioning occasions 388 according to a first PRS configuration. It is noted that the eNB of the reference cell may transmit PRS positioning occasions other than PRS positioning occasions 388 according to a second and/or third PRS configuration, but this is not shown in FIG. 3C. The first PRS configuration for transmission of PRS positioning occasions 388 by the eNB transmitter of the reference cell is shown as having a PRS periodicity of 160 ms, a PRS occasion group length of one, and no PRS frequency hopping in this particular example.

FIG. 3C also shows PRS positioning occasions transmitted by an eNB transmitter (e.g. eNB 106 or eNB 180-1) of a neighbor cell on a frequency layer F2 where there are two PRS configurations available for transmitting PRS positioning occasions 390 according to a first PRS configuration and for transmitting PRS positioning occasions 392 according to a second PRS configuration. The eNB transmitter of the neighbor cell may transmit PRS positioning occasions 390 according to a dense PRS configuration of periodicity 40 ms, and transmit PRS positioning occasions 392 according to a PRS configuration specifying a PRS periodicity of 160 ms in this example. Frequency hopping is used in the example of FIG. 3C for both PRS configurations on the neighbor cell for transmitting PRS occasions 390 and 392, with hopping over four narrow bands and a PRS occasion group length of four for the PRS configuration for transmitting PRS occasions 390, and hopping over two narrow bands and a PRS occasion group length of two for the PRS configuration for transmitting PRS occasions 392.

As pointed out in examples above, a PRS configuration may specify frequency hopping such as alternating between or among a number of carrier frequencies (e.g., between or among two narrow frequency bands or four narrow frequency bands) for transmitting individual PRS occasions. For example, the PRS configuration for transmission of PRS occasions 390 specifies frequency hopping among four narrow frequency bands comprising a Center band and three other narrow bands denoted as $NB_1$, $NB_2$ and $NB_3$. Similarly, the PRS configuration for transmission of PRS occasions 392 specifies frequency hopping among two narrow frequency bands comprising a Centre band and a narrow band $NB_1$.

According to the example illustrated in FIG. 3C, a PRS SFO parameter for a reference cell provided in positioning assistance data may specify an offset between transmission of a first PRS subframe of a PRS occasion group (e.g. the first PRS occasion group) transmitted according to a PRS configuration for transmitting PRS positioning occasions 388, and a first PRS subframe in a closest subsequent PRS occasion group of a PRS configuration of the neighbor cell, transmitted according to a PRS configuration for transmitting PRS positioning occasions 390. This PRS SFO parameter may be determined as offset $SFO_1$ as shown in FIG. 3C. Offset $SFO_1$ may allow UE 102 to center an RSTD search window for acquisition of one or more PRS occasions 390 transmitted by the eNB transmitter of the neighbor cell, and to determine an associated expected time of transmission for each PRS occasion 390 to be acquired. In this example, however, offset $SFO_1$, by itself, may not provide sufficient timing information to UE 102 for centering an RSTD search window and determining an associated expected time of transmission for acquiring PRS positioning occasions 392 transmitted by the eNB transmitter of the neighbor cell.

From offset $SFO_1$ and the PRS configuration information of the neighbor cell, UE 102 may have sufficient information to determine a beginning of a PRS occasion group of PRS positioning occasions 390—e.g. since $SFO_1$, may provide an SFO to the first PRS positioning occasion in a PRS occasion group for PRS positioning occasions 390. With just offset $SFO_1$, however, the beginning of a PRS occasion group of PRS occasions 392 may be ambiguous and may be either $SFO_1$ or $SFO_1+160$ subframes in this example. In other words, UE 102 may not be able to unambiguously determine the offset $SFO_2$ from a PRS SFO specifying $SFO_1$.

According to an embodiment, this ambiguity may be resolved by providing a PRS SFO for the neighbor cell PRS configuration that has a longest periodicity for transmitting PRS positioning occasions, which in this example is the PRS configuration for PRS positioning occasions 392. As pointed out above, in one embodiment, a "periodicity" of a PRS configuration may comprise a time difference between transmission of consecutive PRS positioning occasions transmitted according to the associated PRS configuration. In the particular example in FIG. 3C, such a periodicity may comprise a time difference (or subframe difference) between the start of transmission of PRS positioning occasions 390-1 and 390-2 (for the PRS configuration for transmission of PRS positioning occasions 390) which equals 40 subframes (or 40 ms), or a time difference between the start of transmission of PRS positioning occasions 392-1 and 392-2 (for the PRS configuration for transmission of PRS positioning occasions 392) which equals 160 subframes (or 160 ms). In this context, the PRS configuration among PRS configurations illustrated in FIG. 3C having a "longest periodicity" is the PRS configuration for transmission of PRS positioning occasions 392. This embodiment may be valid when frequency hopping is not used and when a PRS occasion group has a length of one—e.g. as applicable to the example in FIG. 3A.

In an alternative embodiment, a "periodicity" of a PRS configuration may comprise a time difference between transmission of a first PRS positioning occasion in a first PRS occasion group (transmitted according to the PRS configuration) and transmission of a first PRS positioning occasion in a subsequent PRS occasion group (immediately following the first PRS occasion group). In the particular example in FIG. 3C discussed above, such a periodicity of a PRS occasion group may comprise a time difference between a start of transmission of PRS positioning occasions 388-1 (e.g., start of a first subframe in PRS occasion 388-1) and 388-2 (for the PRS configuration for transmission of PRS positioning occasions 388) which equals 160 subframes (or 160 ms). Such a periodicity of a PRS occasion group may also comprise a time difference between a start of transmission of PRS positioning occasions 390-1 and 390-5 (for the PRS configuration for transmission of PRS positioning occasions 390) which equals 160 subframes (or 160 ms). Such a periodicity of a PRS occasion group may further comprise a time difference between a start of transmission of PRS positioning occasions 392-1 and 392-3 (for the PRS configuration for transmission of PRS positioning occasions 392) which equals 320 subframes (or 320 ms). In this context, the PRS configuration among PRS configurations illustrated in FIG. 3C having a "longest periodicity" for the neighbor cell is the PRS configuration for transmission of PRS positioning occasions 392. The alternative embodiment may be valid (e.g. may avoid ambiguity in determination of SFO values for other PRS configurations of a neighbor cell by UE 102) when one or more PRS configurations for a neighbor cell use frequency hopping or have a PRS occasion length that exceeds one as in the example shown in FIG. 3C.

In an example, and as referred to above, a periodicity of a PRS occasion group (which may be referred to as a "PRS occasion group periodicity") may be equal to a PRS periodicity of individual PRS positioning occasions (e.g. $T_{PRS}$ or a time between the start of consecutive PRS positioning occasions) multiplied by a number of PRS positioning occasions in the PRS occasion group (also referred to as the PRS occasion group length). From a value of a PRS SFO for a PRS configuration of a neighbor cell having a longest periodicity and an expected RSTD value (relative to one subframe), which may be provided to UE 105 by a location server (e.g. E-SMLC 110 or H-SLP 118), UE 102 may determine a search window and an associated expected transmission time for PRS occasions transmitted for the neighbor cell according to other PRS configurations having a periodicity equal to or less than that for the PRS configuration having the longest periodicity. In FIG. 3C, for example, $SFO_2$ may be provided in a PRS SFO parameter (e.g. using the LPP protocol) instead of $SFO_1$ since the PRS configuration for transmitting PRS positioning occasions 392 has a longer PRS occasion group periodicity (equal to 320 ms) than the PRS occasion group periodicity for the PRS configuration for transmitting PRS positioning occasions 390 (which equals 160 ms).

In FIG. 3C, if $SFO_2$ is provided to UE 102 by the location server as the PRS SFO for the PRS configuration having a longest periodicity (320 ms) (which is a multiple of the shorter periodicity (160 ms)) and if (as shown in FIG. 3C), the start of the first PRS positioning occasion for the PRS occasion group for PRS occasions 392 is synchronized with the start of the first PRS positioning occasion for the PRS occasion group for PRS occasions 390, UE 102 may obtain $SFO_1$ as $SFO_2$ modulo 160 ms. In an implementation where more than one PRS configuration for a neighbor cell has a longest PRS occasion group periodicity, the location server may provide UE 102 with the PRS SFO for the first PRS configuration with a longest PRS occasion group periodicity for the neighbor cell that is provided to UE 102 in an LPP message.

In one embodiment, in order to enable UE 102 to determine subframe offsets from a subframe offset provided by the location server without ambiguity (e.g., to determine $SFO_1$ from $SFO_2$ in FIG. 3C as just described), each cell may be configured such that the length of any PRS occasion group for the cell equals or exceeds (e.g. is an integer multiple of) the number of different frequency bands over which PRS positioning occasions within the PRS occasion group may be frequency hopped. Thus as an example, a PRS occasion group may have a length of at least two PRS position occasions when frequency hopping over 2 frequency bands is used and a length of least four PRS occasions when frequency hopping over four frequency bands is used.

Figure 4:
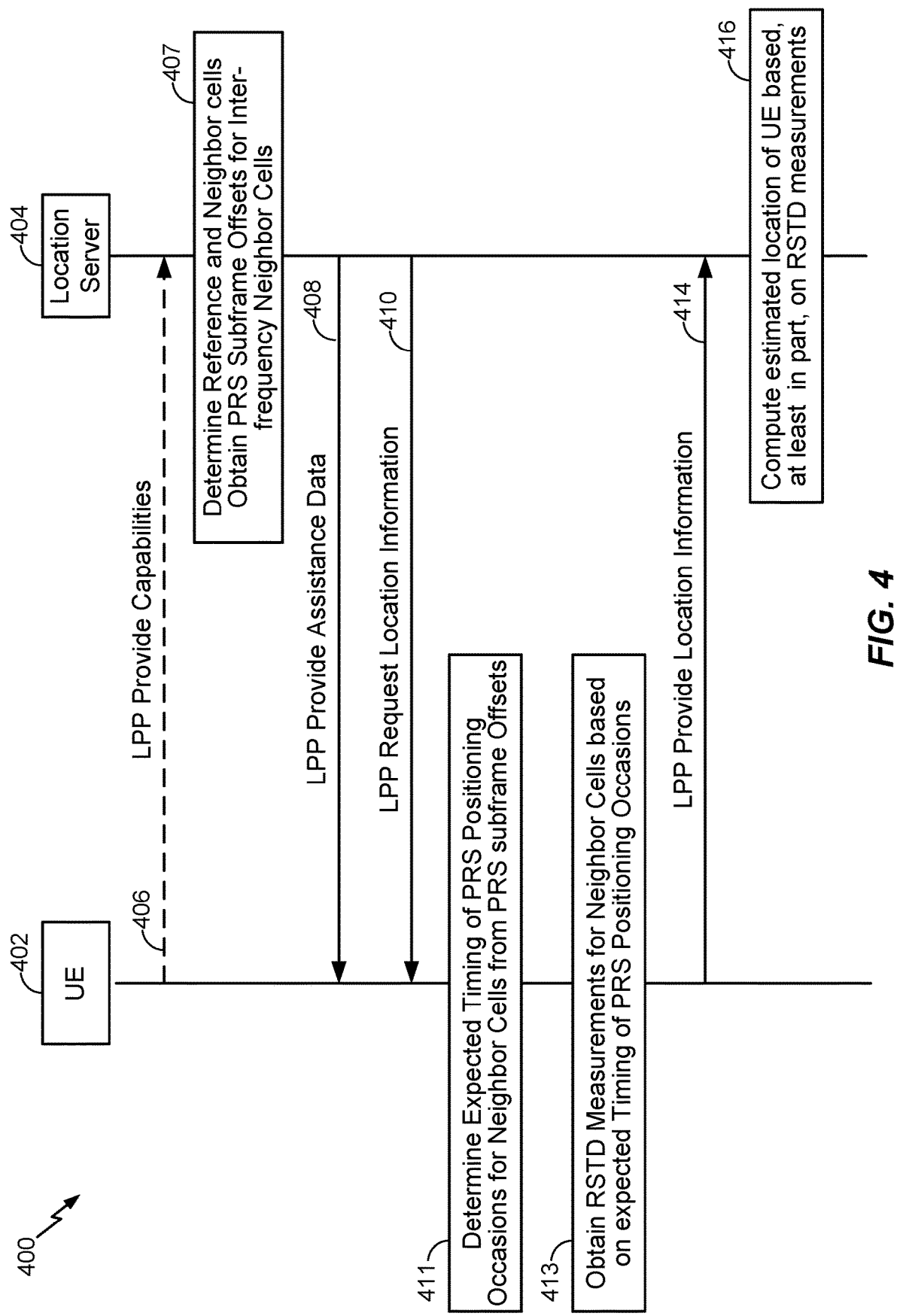
FIG. 4 is a signaling flow diagram according to an embodiment.

FIG. 4 shows an exemplary signaling flow 400 for OTDOA positioning of a UE 402 (e.g., corresponding to UE 102) with LTE or NB-IoT radio access using the LPP positioning protocol. However, other examples exist where UE 402 may have radio access using another RAT (e.g. NR), where the positioning protocol may be different (e.g. may be LPP/LPPe or a New Radio Positioning Protocol (NPP) defined for NR access) and/or where the position method may be different (e.g. may be a variant of OTDOA defined for NR radio access). Signaling flow 400 may be based on use of a CP location solution by UE 402 and location server 404. However, signaling flow 400 may also be applicable to use of the SUPL UP location solution between UE 402 and location server 404 when LPP messages 406, 408, 410 and 414 described further down are transferred between UE 402 and location server 404 embedded within SUPL messages such as SUPL POS messages.

In signaling flow 400. a location server 404 (e.g., corresponding to E-SMLC 110, H-SLP 118 or location server 172) may receive an initial location request for UE 102 (not shown in FIG. 4). For example, the initial location request (if sent) may be sent by an external client 150, by UE 402 or by MME 108 (e.g. if the location server 404 is E-SMLC 110). Location server 404 may then request the positioning capabilities of UE 402—e.g. by sending an LPP Request Capabilities message to UE 402 (not shown in FIG. 4).

In response to receiving a request for positioning capabilities from location server 404 or for other reasons (e.g. to assist location server 404 when UE 402 has requested its location from location server 404), UE 402 may transmit an LPP Provide Capabilities message 406 comprising the positioning capabilities of UE 402 to location server 404. In response, location server 404 may determine a position method or position methods with which to locate UE 402 (e.g. based on the UE positioning capabilities received in the LPP Provide Capabilities message 406). In this example, it is assumed that location server 404 decides to use the OTDOA position method.

Based on information previously received by location server 404 for UE 402 (e.g. in the initial location request or obtained from UE 402 in a message not shown in FIG. 4 such a SUPL message when location server 404 corresponds to H-SLP 118) which may include a serving cell for UE 402 in some implementations, location server 404 determines a reference cell and neighbor cells for OTDOA at block 407 (e.g. by selecting cells nearby to, and possibly including, a serving cell for UE 402). Location server 404 also determines at block 407 PRS SFOs for those neighbor cells (referred to as "inter-frequency" neighbor cells) determined at block 407 which use a different carrier frequency or different LTE frequency band to the reference cell determined at block 407 or which use NB-IoT carriers which may be different to NB-IoT carriers for the reference cell. For each inter-frequency neighbor cell, location server 404 may determine a PRS subframe offset (SFO) at block 407 using techniques described above for FIGS. 3A-3C.

In a first example of block 407, an inter-frequency neighbor cell supports WB LTE wireless access (e.g. with a carrier bandwidth of at least 1.4 MHz) and supports two or more PRS configurations in the same frequency band (e.g. using the same LTE subcarriers) and without a position occasion group or with a PRS occasion group length of one. For the first example, as described previously for FIG. 3A, the location server 404 may determine a PRS SFO that equals the number of subframes (e.g. LTE subframes) between the first PRS subframe for the first PRS configuration of the reference cell and the first PRS subframe of the closet subsequent PRS positioning occasion for the neighbor cell for the PRS configuration that has a longest periodicity. If more than one PRS configuration for the neighbor cell has a longest periodicity, the location server 404 may determine the PRS SFO for the first PRS configuration (to be provided to UE 402 in an LPP message 408 described later) for the neighbor cell that has a longest periodicity.

In a second example of block 407, an inter-frequency neighbor cell is an NB-IoT carrier supporting NB-IoT wireless access (e.g. with a carrier bandwidth of 200 KHz) and is associated with one or more other NB-IoT carriers that may be part of the same WB LTE cell and/' or may provide NB-IoT coverage from the same eNB in the same area. For the second example, as described previously for FIG. 3B, the location server 404 may determine a PRS SFO that equals the number of subframes (e.g. LTE subframes) between the first NPRS subframe of the reference cell (or the first NPRS carrier of the reference cell) and the first NPRS subframe of the closest subsequent NPRS positioning occasion for the neighbor cell for the NPRS carrier of the neighbor cell that has a longest NPRS periodicity. If more than one NPRS carrier for the neighbor cell has a longest NPRS periodicity, the location server 404 may determine the PRS SFO for the first NPRS carrier (to be provided to UE 402 in an LPP message 408 described later) for the neighbor cell that has a longest NPRS periodicity.

In a third example of block 407, an inter-frequency neighbor cell supports WB LTE wireless access (e.g. with a carrier bandwidth of at least 1.4 MHz) and supports two or more PRS configurations that use different frequency bands, use frequency hopping and/or have a PRS occasion group length of more than one. For the third example, as described previously for FIG. 3C, the location server 404 may determine a PRS SFO that equals the number of subframes (e.g. LTE subframes) between the first PRS subframe for the first PRS configuration of the reference cell (or the first PRS subframe for the first PRS occasion group for the first PRS configuration of the reference cell, e.g. when a PRS occasion group has a length of more than one) and the first PRS subframe of the closet subsequent PRS occasion group for the neighbor cell for the PRS configuration that has a longest PRS occasion group periodicity. If more than one PRS configuration for the neighbor cell has a longest PRS occasion group periodicity, the location server 404 may determine the PRS SFO for the first PRS configuration (to be provided to UE 402 in an LPP message 408 described later) for the neighbor cell that has a longest PRS occasion group periodicity.

Following block 407 in signaling flow 400, location server 404 may transmit an LPP Provide Assistance Data message 408 to UE 402 including assistance data for the OTDOA position method. The assistance data for the OTDOA position method may include information for the reference cell and neighbor cells determined at block 407 such as identities for the cells and information about PRS and/or NPRS configurations supported by each of these cells. The PRS and NPRS information may include information described previously such as PRS or NPRS periodicity, number of subframes per positioning occasion, bandwidth, frequency shift, frequency hopping, muting etc. The information may also include each of the PRS SFOs determined at block 407 for the inter-frequency neighbor cells and may further include expected RSTD values for neighbor cells (e.g. based on an approximate location for UE 402 given by a serving cell for UE 402).

Location server 404 may then transmit an LPP Request Location information message 410 to UE 402. The LPP Request Location Information message 410 may request RSTD measurements from UE 102 for the OTDOA position method and may, in some implementations, request other location measurements from UE 402 such as measurements for A-GNSS, ECID or WLAN positioning.

In response to receipt of the LPP Request Location Information message 410 (or in response to receipt of the LPP Provide Assistance Data message 408), UE 402 may determine at block 411 the expected timing of PRS positioning occasions for neighbor cells based on the PRS subframe offsets received in message 408. For example, the determination of the expected timing of PRS positioning occasions for neighbor cells may be as exemplified in FIGS. 3A-3C. Thus, for example, UE 402 may use a PRS SFO for a particular PRS configuration or particular NPRS carrier for a neighbor cell to determine an expected arrival time for PRS or NPRS positioning occasions for this PRS configuration or NPRS carrier and may combine this with an expected RSTD for this neighbor cell to further determine a more precise time of arrival and a search window. UE 402 may also use a PRS SFO for a particular PRS configuration or particular NPRS carrier for a neighbor cell to unambiguously determine a PRS SFO for one or more other PRS configurations or one or more other NPRS carriers for the neighbor cell (e.g. as described for the examples in FIGS. 3A-3C). UE 402 may then combine each determined PRS SFO with an expected RSTD for the neighbor cell to further determine a more precise time of arrival and a search window for the one or more other PRS configurations or one or more other NPRS carriers for the neighbor cell.

UE 402 may then at block 413 obtain RSTD measurements for one or more of the neighbor cells based on the expected timing of PRS positioning occasions determined at block 411. For example, a search window obtained at block 411 for a neighbor cell may enable UE 402 to know approximately when a PRS or NPRS positioning occasion for the neighbor cell will be received at UE 402 and to perform a coherent or non-coherent integration of the received PRS or NPRS and measure a TOA. UE 402 may then determine an RSTD for the neighbor cell by subtracting a TOA measured for the reference cell from the TOA measured for the neighbor cell.

UE 402 may return the RSTD measurements obtained at block 413 to the location server 404 in an LPP Provide Location Information message 414 and location server 404 may determine a location for UE 402 at block 416 based at least on part on the received RSTD measurements (e.g. using the OTDOA position method). Location server 404 may then return the location to an entity (e.g. external client 150 or MME 108) which sent an initial request for a location of UE 402 to location server 404 (not shown in FIG. 4).

In a variant of signaling flow 400, UE 402 may determine the location of UE 402 following block 413 (e.g. using the OTDOA position method) based at least on part on the RSTD measurements obtained at block 413 and on assistance data received in the LPP Provide Assistance Data message 408 and/or received from an eNB (e.g. eNB 104) via broadcast (e.g. which may include the location coordinates of eNB antennas for the reference and neighbor cells and/or transmission timing differences between the reference cell and neighbor cells). In this variant, UE 102 may include the determined location of UE 102 in the LPP Provide Location Information message 414 and block 416 may not occur.

Figure 5A:
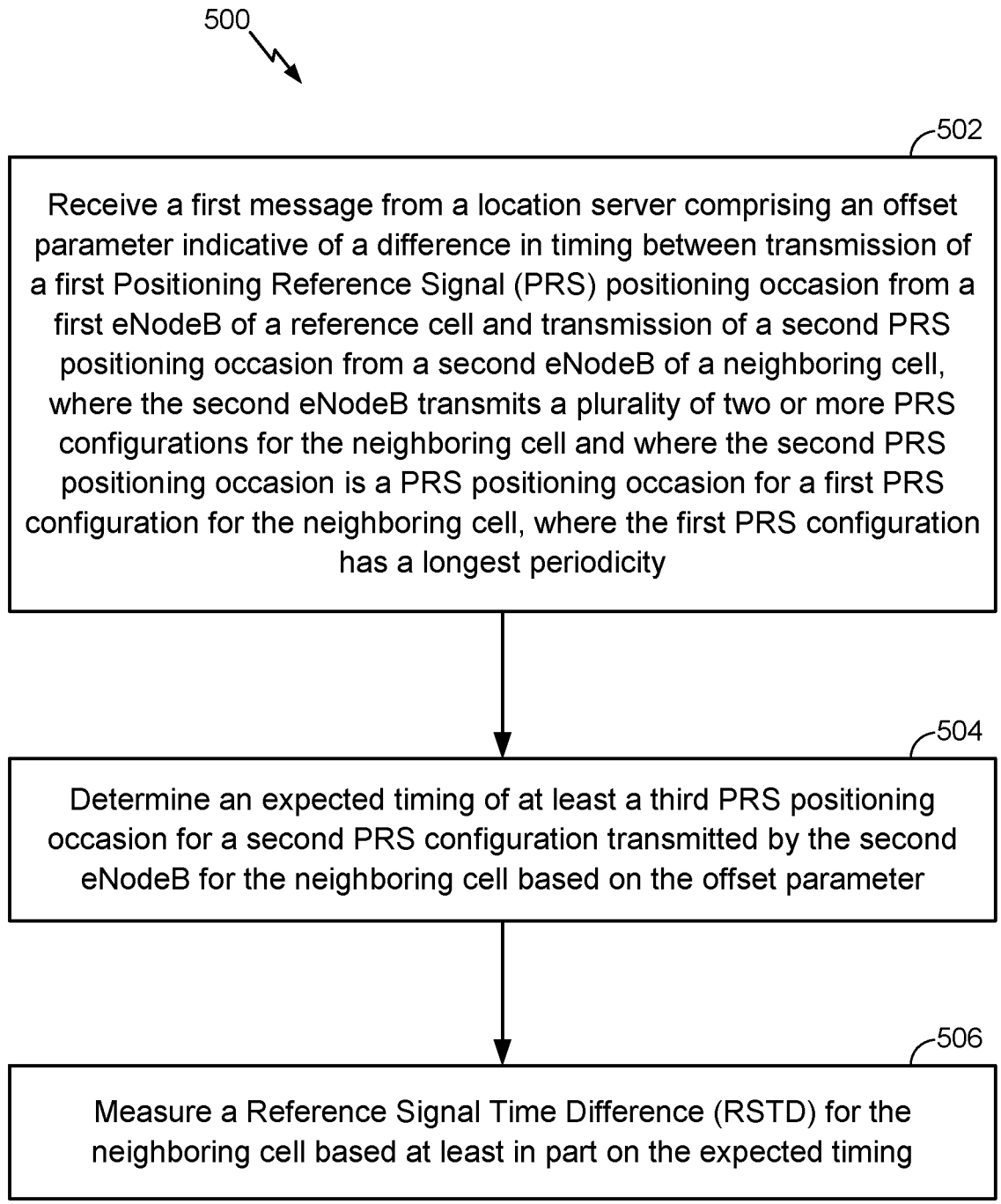
FIG. 5A is a flow diagram of a process at a mobile device to acquire a positioning signal according to an embodiment.

FIG. 5A shows a flow chart exemplifying a method 500, performed at a mobile device, of supporting location of the mobile device when the mobile device has Long Term Evolution (LTE) or Narrow Band Internet of Things (NB-IoT) wireless access. The mobile device may correspond to UE 102 or UE 402, and the LTE or NB-IoT wireless access may be provided by any of eNBs 104, 106, 180 or 182.

Method 500 may start at block 502, where the mobile device receives a first message from a location server comprising an offset parameter indicative of a difference in timing between transmission of a first Positioning Reference Signal (PRS) positioning occasion from a first eNodeB of a reference cell and transmission of a second PRS positioning occasion from a second eNodeB of a neighboring cell, where the second eNodeB transmits a plurality of two or more PRS configurations for the neighboring cell and where the second PRS positioning occasion is a PRS positioning occasion for a first PRS configuration for the neighboring cell, where the first PRS configuration has a longest periodicity. The location server may be an E-SMLC or SLP and may correspond to any of E-SMLC 110, H-SLP 118, location server 172 or location server 404. The first eNodeB and second eNodeB may correspond to any of eNodeBs 104, 106, 180 or 182. For example, the first eNodeB may correspond to a serving eNodeB 104 for the mobile device and the second eNodeB may correspond to another eNodeB. The offset parameter may comprise a subframe offset (e.g. an LTE subframe offset) and/or may correspond to a PRS subframe offset as described for FIGS. 3A-3C (e.g. may correspond to SDO2 for the example in FIG. 3A, to SFO-2 for the example in FIG. 3B or to SDO$_2$ for the example in FIG. 3C). The offset parameter may have been determined by the location server as described for block 407 of signaling flow 400. The first message may be an LPP Provide Assistance Data message and may correspond to LPP Provide Assistance Data message 408 in signaling flow 400.

At block 504, the mobile device determines an expected timing of at least a third PRS positioning occasion for a second PRS configuration transmitted by the second eNodeB for the neighboring cell based on the offset parameter. In an aspect, the second PRS configuration may be different to the first PRS configuration. For example, the mobile device may determine the expected timing as described for the examples in FIGS. 3A-3C and/or as described for block 411 of signaling flow 400. In the example in FIG. 3A, the first PRS positioning occasion may correspond to PRS positioning occasion 352-1, the second PRS positioning occasion may correspond to PRS positioning occasion 356-2, the first PRS configuration may comprise PRS occasions 356, and the offset parameter may corresponds to SFO2. The mobile device may then determine SFO1 based on SFO2 as described for FIG. 3A for the third PRS positioning occasion which may be PRS positioning occasion 354-3 for the second PRS configuration comprising PRS occasions 354. The mobile device may then determine an expected timing (e.g. a search window) for the third positioning occasion based on SFO1 and an expected RSTD which may also be received by the mobile device in the first message. Similarly, in the example in FIG. 3B, the first PRS positioning occasion may correspond to the first NPRS positioning occasion 386, the second PRS positioning occasion may correspond to an NPRS positioning occasion 364, the first PRS configuration may comprise NPRS positioning occasions 364, and the offset parameter may correspond to SFO-2. The mobile device may then determine SFO-1 or SFO-3 based on SFO-2 as described for FIG. 3B for the third PRS positioning occasion which may be a PRS positioning occasion 362 or 366 for a second PRS configuration comprising PRS occasions 362 or 366, in each case respectively. The mobile device may then determine an expected timing (e.g. a search window) for the third positioning occasion based on SFO-1 or SFO-3 and an expected RSTD which may also be received by the mobile device in the first message. Further, in the example in FIG. 3C, the first PRS positioning occasion may correspond to PRS positioning occasion 388-1, the second PRS positioning occasion may correspond to PRS positioning occasion 392-3, the first PRS configuration may comprise PRS positioning occasions 392, and the offset parameter may correspond to SFO$_2$. The mobile device may then determine SFO$_1$ based on SFO$_2$ as described for FIG. 3C for the third PRS positioning occasion which may be PRS positioning occasion 390-5 for a second PRS configuration comprising PRS occasions 390. The mobile device may then determine an expected timing (e.g. a search window) for the third positioning occasion based on SFO$_1$ and an expected RSTD which may also be received by the mobile device in the first message.

At block 506, the mobile device may measure a Reference Signal Time Difference (RSTD) for the neighboring cell based at least in part on the expected timing determined at block 504. Block 506 may correspond to block 413 in signaling flow 400.

In an aspect, the longest periodicity in block 502 comprises the longest periodicity between consecutive PRS positioning occasions, e.g. as described in association with FIG. 3A.

In an aspect, and as exemplified in FIG. 3C, each of the plurality of two or more PRS configurations for the neighboring cell comprise PRS occasion groups. In this aspect, the longest periodicity may comprise the longest PRS occasion group periodicity, e.g. as described for FIG. 3C. In this aspect, and as described for FIG. 3C, at least one of the PRS configurations for the neighboring cell may use frequency hopping over a number N of frequency bands and the PRS occasion group length for the at least one of the PRS configurations for the neighboring cell may then be equal to or greater than the number N (e.g. may be an integer multiple of N). In this aspect, and as described for FIG. 3C, the first PRS positioning occasion may be the first PRS positioning occasion for the reference cell following subframe zero of system frame number zero and the second PRS positioning occasions may be the first PRS positioning occasion for a position occasion group for the first PRS configuration for the neighboring cell, where the position occasion group immediately follows the first PRS positioning occasion.

In an aspect, and as exemplified in signaling flow 400 at block 407 and for FIGS. 3A-3C, the neighboring cell and reference cell use different frequency bands.

In an aspect, and as exemplified by FIG. 3C, at least one of the PRS configurations for the neighboring cell may use frequency hopping. In this aspect, and as described for FIG. 3C, the periodicity between consecutive PRS positioning occasions for the at least one of the two or more PRS configurations for the neighboring cell may comprise the periodicity between consecutive PRS positioning occasions that use the same frequency.

In an aspect, and as described for FIGS. 3A-3C, the first PRS positioning occasion is the first PRS positioning occasion for the reference cell following subframe zero of system frame number zero and the second PRS positioning occasion is the PRS positioning occasion for the first PRS configuration for the neighboring cell which immediately follows the first PRS positioning occasion.

In an aspect, and as described for FIGS. 3A-3C, the first PRS configuration for the neighboring cell may use frequency hopping and the offset parameter may further comprise an indication of a frequency band for the second PRS positioning occasion.

In an aspect, following block 506, the mobile device may send a second message to the location server, where the second message comprises the RSTD. For example, the second message may be an LPP Provide Location information message and may correspond to LPP Provide Location information message 414 in signaling flow 400.

Figure 5B:
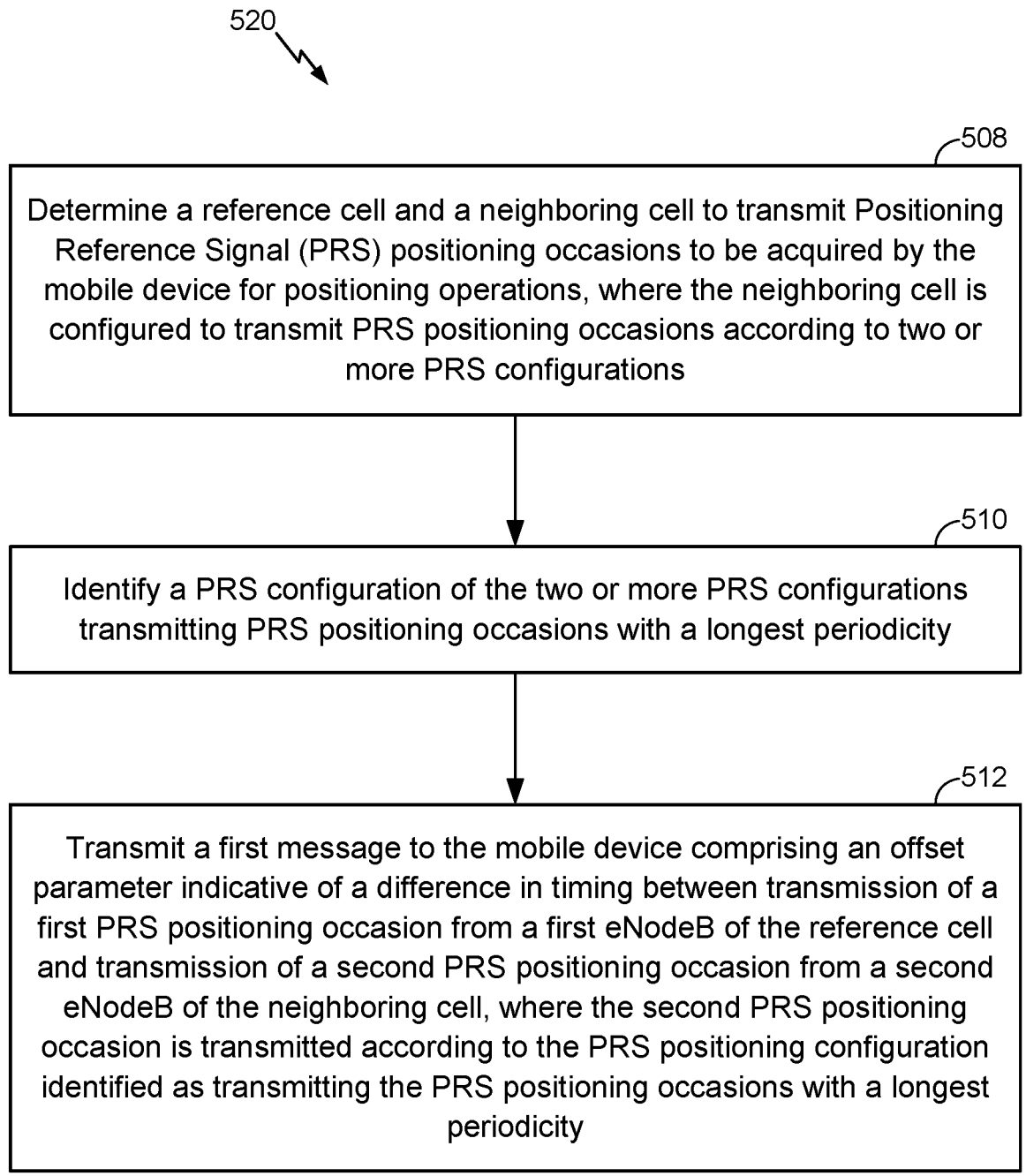
FIG. 5B is a flow diagram of a process at a server to determine and transmit an offset parameter according to an embodiment.

FIG. 5B shows a flow chart exemplifying a method 520, performed at a location server, of supporting location of a mobile device when the mobile device has Long Term Evolution (LTE) or Narrow Band Internet of Things (NB-IoT) wireless access. The location server may be an E-SMLC or SLP and may correspond to any of E-SMLC 110, H-SLP 118, location server 172 or location server 404. The mobile device may correspond to UE 102 or UE 402.

Method 520 may start at block 508, where the location server determines a reference cell and a neighboring cell to transmit Positioning Reference Signal (PRS) positioning occasions to be acquired by the mobile device for positioning operations, where the neighboring cell is configured to transmit PRS positioning occasions according to two or more PRS configurations. Block 507 may correspond to part of block 407 in signaling flow 400

At block 510, the location server identifies a PRS configuration of the two or more PRS configurations transmitting PRS positioning occasions with a longest periodicity. For example, the PRS configuration with the longest periodicity may be identified as described for FIGS. 3A-3C and for block 407 of signaling flow 400.

At block 512, the location server transmits a first message to the mobile device comprising an offset parameter indicative of a difference in timing between transmission of a first PRS positioning occasion from a first eNodeB of the reference cell and transmission of a second PRS positioning occasion from a second eNodeB of the neighboring cell, where the second PRS positioning occasion is transmitted according to the PRS positioning configuration identified as transmitting the PRS positioning occasions with a longest periodicity. The offset parameter may comprise a subframe offset (e.g. an LTE subframe offset) and/or may correspond to a PRS subframe offset as described for FIGS. 3A-3C (e.g. may correspond to SFO2 for the example in FIG. 3A, to SFO-2 for the example in FIG. 3B or to $SDO_2$ for the example in FIG. 3C). The offset parameter may be determined by the location server as described for block 407 of signaling flow 400. The first message may be an LPP Provide Assistance Data message and may correspond to LPP Provide Assistance Data message 408 in signaling flow 400.

In an aspect, the mobile device is capable of determining timing of PRS positioning occasions transmitted according to each of the two or more PRS configurations based, at least in part, on the offset parameter. For example, the mobile device may be capable of performing block 411 as described for signaling flow 400.

In an aspect, the longest periodicity for a PRS configuration comprises the longest periodicity between consecutive PRS positioning occasions, e.g. as described in association with FIGS. 3A-3C In an aspect, each of the two or more PRS configurations for the neighboring cell comprise PRS occasion groups. In this aspect, the longest periodicity may comprise the longest PRS occasion group periodicity as described for FIG. 3C. In this aspect and as described for FIGS. 3A-3C, at least one of the two or more PRS configurations for the neighboring cell may use frequency hopping over a number N of frequency bands, where the PRS occasion group length for the at least one of the two or more PRS configurations for the neighboring cell is equal to or greater than the number N (e.g. is an integer multiple of N). In this aspect and as described for FIG. 3C, the first PRS positioning occasion may be the first PRS positioning occasion for the reference cell following subframe zero of system frame number zero and the second PRS positioning occasion may be the first PRS positioning occasion for a position occasion group for the identified PRS configuration with a longest periodicity for the neighboring cell, where the position occasion group immediately follows the first PRS positioning occasion.

In an aspect, the neighboring cell and reference cell use different frequency bands.

In an aspect, at least one of the two or more PRS configurations for the neighboring cell may use frequency hopping. In this aspect, and as described for FIGS. 3A-3C, the periodicity between consecutive PRS positioning occasions for the at least one of the two or more PRS configurations for the neighboring cell may comprise the periodicity between consecutive PRS positioning occasions that use the same frequency.

In an aspect, and as described for FIGS. 3A-3C, the first PRS positioning occasion is the first PRS positioning occasion for the reference cell following subframe zero of system frame number zero and the second PRS positioning occasions is the PRS positioning occasion for the identified PRS configuration with a longest periodicity for the neighboring cell which immediately follows the first PRS positioning occasion.

In an aspect, the identified PRS configuration for the neighboring cell with a longest periodicity uses frequency hopping. In this aspect, and as described for FIGS. 3A-3C, the offset parameter further comprises an indication of a frequency band for the second PRS positioning occasion.

In an aspect, following block 512, the location server receives a second message from the mobile device comprising a Reference Signal Time Difference (RSTD) measurement for the neighboring cell. For example, the second message may comprise an LPP Provide Location information message and may correspond to LPP Provide Location Information message 414 in signaling flow 400.

Figure 6:
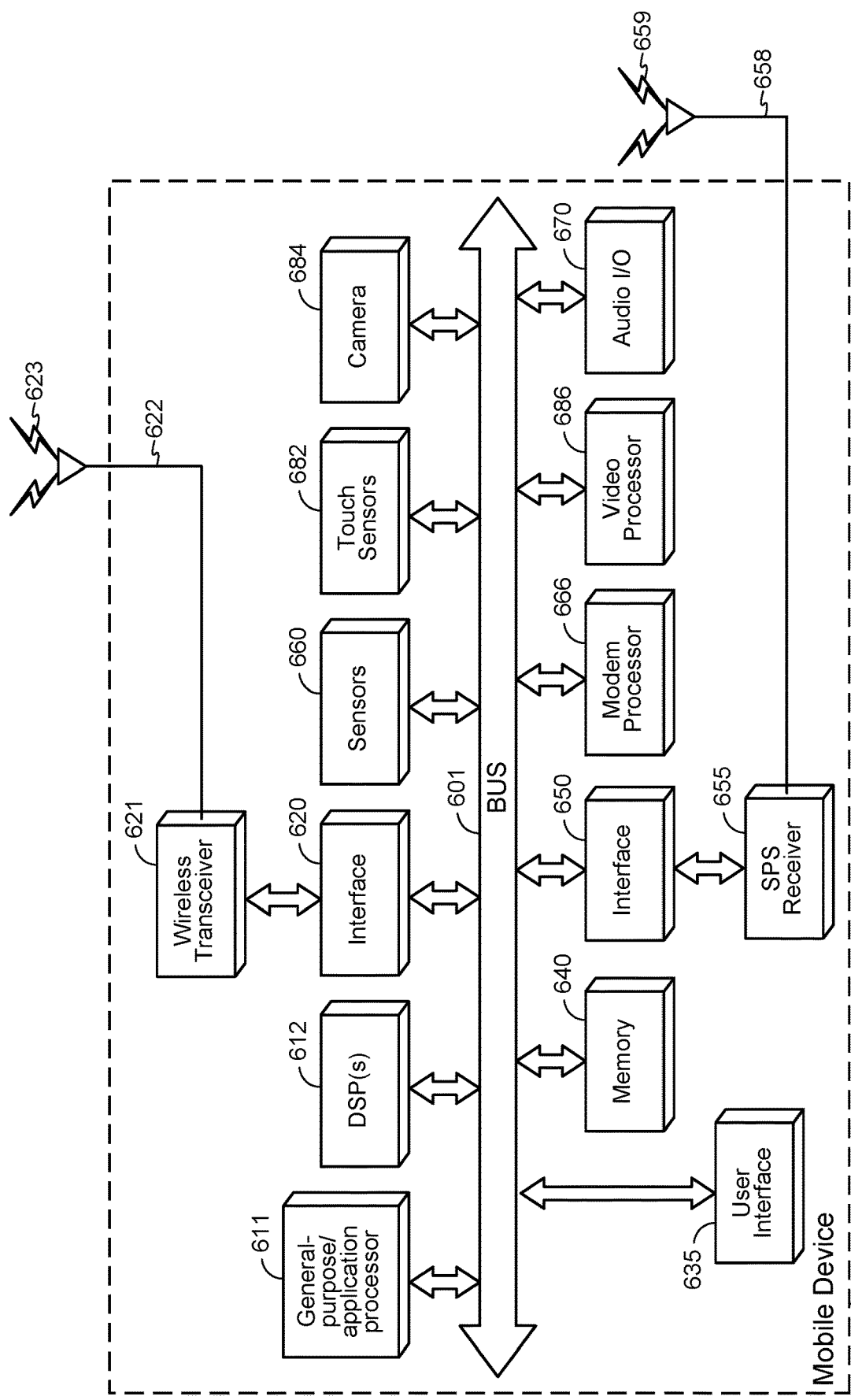
FIG. 6 is a schematic block diagram of a mobile device, in accordance with an example implementation.
Figure 7:
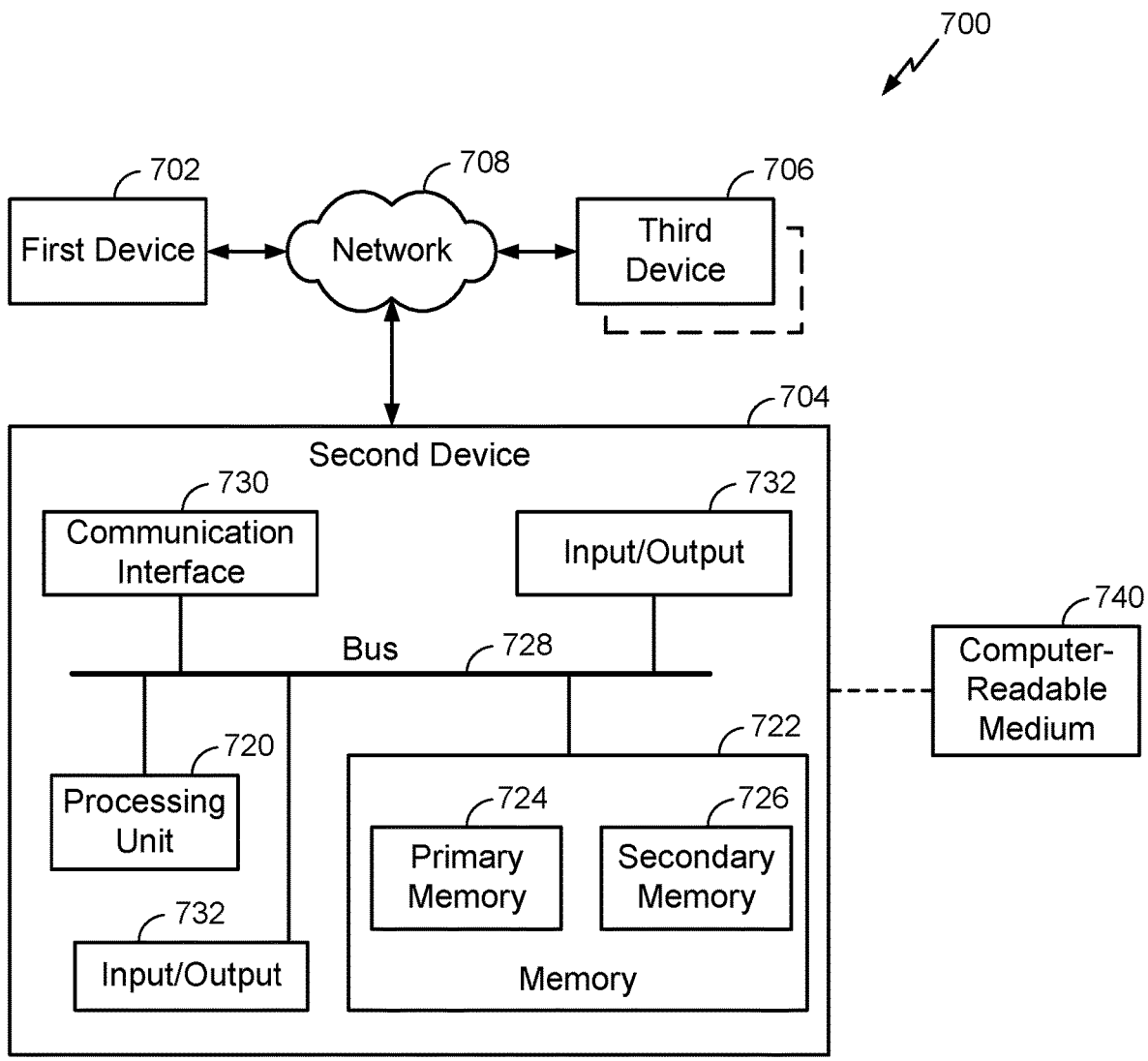
FIG. 7 is a schematic block diagram of an example computing platform in accordance with an implementation.

Subject matter shown in FIGS. 6 and 7 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIGS. 5A and 5B, and corresponding text of the present disclosure.

FIG. 6 is a schematic diagram of a mobile device 600 according to an embodiment. UE 102 and/or UE 402 as shown in FIGS. 1A, 1B, and 4 may comprise one or more features of mobile device 600 shown in FIG. 6. In certain embodiments, mobile device 600 may comprise a wireless transceiver 621 which is capable of transmitting and receiving wireless signals 623 via wireless antenna 622 over a wireless communication network. Wireless transceiver 621 may be connected to bus 601 by a wireless transceiver bus interface 620. Wireless transceiver bus interface 620 may, in some embodiments be at least partially integrated with wireless transceiver 621. Some embodiments may include multiple wireless transceivers 621 and wireless antennas 622 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples.

Mobile device 600 may also comprise SPS receiver 655 capable of receiving and acquiring SPS signals 659 via SPS antenna 658 (which may be the same as antenna 622 in some embodiments). SPS receiver 655 may also process, in whole or in part, acquired SPS signals 659 for estimating a location of mobile device 600. In some embodiments, general-purpose processor(s) 611, memory 640, digital signal processor(s) (DSP(s)) 612 and/or specialized processors (not shown) may also be utilized to process acquired SPS signals, in whole or in part, and/or calculate an estimated location of mobile device 600, in conjunction with SPS receiver 655. Storage of SPS or other signals (e.g., signals acquired from wireless transceiver 621) or storage of measurements of these signals (e.g. RSTD measurements) for use in performing positioning operations may be performed in memory 640 or registers (not shown). General-purpose processor(s) 611, memory 640, DSP(s) 612 and/or specialized processors may provide or support a location engine for use in processing measurements to estimate a location of mobile device 600. In a particular implementation, all or portions of actions or operations set forth for process 500 may be executed by general-purpose processor(s) 611 or DSP(s) 612 based on machine-readable instructions stored in memory 640. For example general-purpose processor(s) 611 or DSP(s) 612 may process a downlink signal acquired by wireless transceiver 621 to, for example, measure a TOA and determine an RSTD as described above.

Also shown in FIG. 6, digital signal processor(s) (DSP(s)) 612 and general-purpose processor(s) 611 may be connected to memory 640 through bus 601. A particular bus interface (not shown) may be integrated with the DSP(s) 612, general-purpose processor(s) 611 and memory 640. In various embodiments, functions may be performed in response to execution of one or more machine-readable instructions stored in memory 640 such as on a computer-readable storage medium, such as RAM, ROM, FLASH, or disc drive, just to name a few example. The one or more instructions may be executable by general-purpose processor(s) 611, specialized processors, or DSP(s) 612. Memory 640 may comprise a non-transitory processor-readable memory and/or a computer-readable memory that stores software code (programming code, instructions, etc.) that are executable by processor(s) 611 and/or DSP(s) 612 to perform functions or actions described above in connection with FIGS. 5A and 5B.

Also shown in FIG. 6, a user interface 635 may comprise any one of several devices such as, for example, a speaker, microphone, display device, vibration device, keyboard, touch screen, just to name a few examples. In a particular implementation, user interface 635 may enable a user to interact with one or more applications hosted on mobile device 600. For example, devices of user interface 635 may store analog or digital signals on memory 640 to be further processed by DSP(s) 612 or general purpose processor 611 in response to action from a user. Similarly, applications hosted on mobile device 600 may store analog or digital signals on memory 640 to present an output signal to a user. In another implementation, mobile device 600 may optionally include a dedicated audio input/output (I/O) device 670 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 600 may comprise touch sensors 662 responsive to touching or pressure on a keyboard or touch screen device.

Mobile device 600 may also comprise a dedicated camera device 684 for capturing still or moving imagery. Camera device 684 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 611 or DSP(s) 612. Alternatively, a dedicated video processor 686 may perform conditioning, encoding, compression or manipulation of signals representing captured images. Additionally, video processor 686 may decode/decompress stored image data for presentation on a display device (not shown) on mobile device 600.

Mobile device 600 may also comprise sensors 660 coupled to bus 601 which may include, for example, inertial sensors and environment sensors. Inertial sensors of sensors 660 may comprise, for example accelerometers (e.g., collectively responding to acceleration of mobile device 600 in three dimensions), one or more gyroscopes or one or more magnetometers (e.g., to support one or more compass applications). Environment sensors of mobile device 600 may comprise, for example, temperature sensors, barometric pressure sensors, ambient light sensors, camera imagers, microphones, just to name a few examples. Sensors 660 may generate analog or digital signals that may be stored in memory 640 and processed by DPS(s) 612 or general purpose application processor 611 in support of one or more applications such as, for example, applications directed to positioning or navigation operations.

In a particular implementation, mobile device 600 may comprise a dedicated modem processor 666 capable of performing baseband processing of signals received and downconverted at wireless transceiver 621 or SPS receiver 655. Similarly, modem processor 666 may perform baseband processing of signals to be upconverted for transmission by wireless transceiver 621. In alternative implementations, instead of having a dedicated modem processor, baseband processing may be performed by a general purpose processor or DSP (e.g., general purpose/application processor 611 or DSP(s) 612). It should be understood, however, that these are merely examples of structures that may perform baseband processing, and that claimed subject matter is not limited in this respect.

FIG. 7 is a schematic diagram illustrating an example system 700 that may include one or more devices configurable to implement techniques or processes described above. System 700 may include, for example, a first device 702, a second device 704, and a third device 706, which may be operatively coupled together through a wireless communications network 708. In an aspect, second device 704 may comprise a server or location server, such as E-SMLC 110, H-SLP 118, location server 172 or location server 404 in FIGS. 1A, 1B and 4. Also, in an aspect, wireless communications network 708 may comprise one or more wireless access points, for example, and may correspond to VPLMN E-UTRAN 120, VPLMN EPC 130, HPLMN 140 and/or serving network 186. However, claimed subject matter is not limited in scope in these respects.

First device 702, second device 704 and third device 706 may be representative of any device, appliance or machine. By way of example but not limitation, any of first device 702, second device 704, or third device 706 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 702, 704, and 706, respectively, may comprise one or more of a location server, a base station almanac server, a location server function, a base station, or a mobile device in accordance with the examples described herein.

Similarly, wireless communications network 708, may be representative of one or more communication links, processes, or resources configurable to support the exchange of signaling and/or data between at least two of first device 702, second device 704, and third device 706. By way of example but not limitation, wireless communications network 708 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 706, there may be additional like devices operatively coupled to wireless communications network 708.

It is recognized that all or part of the various devices and networks shown in system 700, and the processes and methods as further described herein, may be implemented using or otherwise including hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory 724 or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any non-transitory medium that can carry or make accessible data, code or instructions for one or more of the devices in system 700. Computer-readable medium 740 may also be referred to as a storage medium. For example, computer-readable medium 740 may store computer readable instructions to, at least in part, perform actions shown in FIGS. 5A and 5B and discussed above.

Second device 704 may include, for example, a communication interface 730 that provides for or otherwise supports the operative coupling of second device 704 to at least wireless communications network 708. By way of example but not limitation, communication interface 730 may include a network interface device or card, a modem, a router, a switch, a transceiver, and the like.

Second device 704 may include, for example, an input/output device 732. Input/output device 732 is representative of one or more devices or features that may be configurable to accept or otherwise introduce human or machine inputs, or one or more devices or features that may be configurable to deliver or otherwise provide for human or machine outputs. By way of example but not limitation, input/output device 732 may include an operatively configured display, speaker, keyboard, mouse, trackball, touch screen, data port, etc.

Particular embodiments described herein are directed to a method, at a location server, for locating a mobile device having Long Term Evolution (LTE) or Narrow Band Internet of Things (NB-IoT) wireless access, comprising: determining a reference cell and a neighboring cell to transmit Positioning Reference Signal (PRS) positioning occasions to be acquired by the mobile device for positioning operations, the neighboring cell being configured to transmit PRS positioning occasions according to two or more PRS configurations; identifying a PRS configuration of the two or more PRS configurations transmitting PRS positioning occasions with a longest periodicity; and transmitting a first message to the mobile device comprising an offset parameter indicative of a difference in timing between transmission of a first PRS positioning occasion from a first eNodeB of the reference cell and transmission of a second PRS positioning occasion from a second eNodeB of the neighboring cell, wherein the second PRS positioning occasion is transmitted according to the PRS positioning configuration identified as transmitting the PRS positioning occasions with a longest periodicity, wherein the mobile device is capable of determining timing of PRS positioning occasions transmitted according to each of the two or more PRS configurations based, at least in part, on the offset parameter. In one example implementation, the longest periodicity comprises the longest periodicity between consecutive PRS positioning occasions. In another example implementation, each of the two or more PRS configurations for the neighboring cell comprise PRS occasion groups and wherein the longest periodicity comprises the longest PRS occasion group periodicity. In another particular implementation, the neighboring cell and reference cell use different frequency bands. In another particular implementation, at least one of the two or more PRS configurations for the neighboring cell uses frequency hopping and wherein the periodicity between consecutive PRS positioning occasions for the at least one of the two or more PRS configurations for the neighboring cell comprises the periodicity between consecutive PRS positioning occasions that use the same frequency. In another particular implementation, at least one of the two or more PRS configurations for the neighboring cell uses frequency hopping over a number N of frequency bands and wherein the PRS occasion group length for the at least one of the two or more PRS configurations for the neighboring cell is equal to or greater than the number N. In another particular implementation, the first PRS positioning occasion is the first PRS positioning occasion for the reference cell following subframe zero of system frame number zero and the second PRS positioning occasions is the PRS positioning occasion for the identified PRS configuration with a longest periodicity for the neighboring cell which immediately follows the first PRS positioning occasion. In another particular implementation, the first PRS positioning occasion is the first PRS positioning occasion for the reference cell following subframe zero of system frame number zero and the second PRS positioning occasion is the first PRS positioning occasion for a position occasion group for the identified PRS configuration with a longest periodicity for the neighboring cell, wherein the position occasion group immediately follows the first PRS positioning occasion. In another particular implementation, the offset parameter comprises a subframe offset. In another particular implementation, the identified PRS configuration for the neighboring cell with a longest periodicity uses frequency hopping and wherein the offset parameter further comprises an indication of a frequency band for the second PRS positioning occasion. In another particular implementation, the method further comprises: receiving a second message from the mobile device comprising a Reference Signal Time Difference (RSTD) measurement for the neighboring cell. In another particular implementation, the first message is an LTE Positioning Protocol (LPP) Provide Assistance Data message. In another particular implementation, the second message is an LPP Provide Location information message.

In another particular implementation, the location server is an Enhanced Serving Mobile Location Center (E-SMLC) or a Secure User Plane Location (SUPL) Location Platform (SLP).

Other particular embodiments described herein are directed to a non-transitory storage medium comprising computer readable instructions stored thereon which are executable by one or more processors at a server device to: determine a reference cell and a neighboring cell to transmit PRS positioning occasions to be acquired by a client mobile device for positioning operations, the neighboring cell being configured to transmit PRS positioning occasions according to two or more PRS configurations; identify a PRS configuration of the two or more PRS configurations transmitting PRS positioning occasions with a longest periodicity; and initiate transmission of a first message to the client mobile device comprising an offset parameter indicative of a difference in timing between transmission of a first PRS positioning occasion from a first eNodeB of the reference cell and transmission of a second PRS positioning occasion from a second eNodeB of the neighboring cell transmitted according to the PRS positioning configuration identified as transmitting the PRS positioning occasions with a longest periodicity, wherein the client mobile device is capable of determining timing of PRS positioning occasions transmitted according to at least one of the two or more PRS configurations based, at least in part, on the difference in timing between transmission of the first PRS positioning occasion and transmission of the second PRS positioning occasion. In one example implementation, the longest periodicity comprises the longest periodicity between consecutive PRS positioning occasions. In another example implementation, each of the two or more PRS configurations for the neighboring cell comprise PRS occasion groups and wherein the longest periodicity comprises the longest PRS occasion group periodicity. In another particular implementation, the neighboring cell and reference cell use different frequency bands. In another particular implementation, at least one of the two or more PRS configurations for the neighboring cell uses frequency hopping and wherein the periodicity between consecutive PRS positioning occasions for the at least one of the two or more PRS configurations for the neighboring cell comprises the periodicity between consecutive PRS positioning occasions that use the same frequency. In another particular implementation, at least one of the two or more PRS configurations for the neighboring cell uses frequency hopping over a number N of frequency bands and wherein the PRS occasion group length for the at least one of the two or more PRS configurations for the neighboring cell is equal to or greater than the number N. In another particular implementation, the first PRS positioning occasion is the first PRS positioning occasion for the reference cell following subframe zero of system frame number zero and the second PRS positioning occasions is the PRS positioning occasion for the identified PRS configuration with a longest periodicity for the neighboring cell which immediately follows the first PRS positioning occasion. In another particular implementation, the first PRS positioning occasion is the first PRS positioning occasion for the reference cell following subframe zero of system frame number zero and the second PRS positioning occasion is the first PRS positioning occasion for a position occasion group for the identified PRS configuration with a longest periodicity for the neighboring cell, wherein the position occasion group immediately follows the first PRS positioning occasion. In another particular implementation, the offset parameter comprises a subframe offset. In another particular implementation, the identified PRS configuration for the neighboring cell with a longest periodicity uses frequency hopping and wherein the offset parameter further comprises an indication of a frequency band for the second PRS positioning occasion. In another particular implementation, the instructions are further executable to obtain a second message received from the mobile device comprising a Reference Signal Time Difference (RSTD) measurement for the neighboring cell. In another particular implementation, the first message is an LTE Positioning Protocol (LPP) Provide Assistance Data message. In another particular implementation, the second message is an LPP Provide Location information message. In another particular implementation, the location server is an Enhanced Serving Mobile Location Center (E-SMLC) or a Secure User Plane Location (SUPL) Location Platform (SLP).

Other particular embodiments described herein are directed to a server device, comprising: means for determining a reference cell and a neighboring cell to transmit PRS positioning occasions to be acquired by a client mobile device for positioning operations, the neighboring cell being configured to transmit PRS positioning occasions according to two or more PRS configurations; means for identifying a PRS configuration of the two or more PRS configurations transmitting PRS positioning occasions with a longest periodicity; and means for transmitting a first message to the client mobile device comprising an offset parameter indicative of a difference in timing between transmission of a first PRS positioning occasion from a first eNodeB of the reference cell and transmission of a second PRS positioning occasion from a second eNodeB of the neighboring cell transmitted according to the PRS positioning configuration identified as transmitting the PRS positioning occasions with a longest periodicity, wherein the client mobile device is capable of determining timing of PRS positioning occasions transmitted according to at least one of the two or more PRS configurations based, at least in part, on the difference in timing between transmission of the first PRS positioning occasion and transmission of the second PRS positioning occasion. In one example implementation, the longest periodicity comprises the longest periodicity between consecutive PRS positioning occasions. In another example implementation, each of the two or more PRS configurations for the neighboring cell comprise PRS occasion groups and wherein the longest periodicity comprises the longest PRS occasion group periodicity. In another particular implementation, the neighboring cell and reference cell use different frequency bands. In another particular implementation, at least one of the two or more PRS configurations for the neighboring cell uses frequency hopping and wherein the periodicity between consecutive PRS positioning occasions for the at least one of the two or more PRS configurations for the neighboring cell comprises the periodicity between consecutive PRS positioning occasions that use the same frequency. In another particular implementation, at least one of the two or more PRS configurations for the neighboring cell uses frequency hopping over a number N of frequency bands and wherein the PRS occasion group length for the at least one of the two or more PRS configurations for the neighboring cell is equal to or greater than the number N. In another particular implementation, the first PRS positioning occasion is the first PRS positioning occasion for the reference cell following subframe zero of system frame number zero and the second PRS positioning occasions is the PRS positioning occasion for the identified PRS configuration with a longest periodicity for the neighboring cell which immediately follows the first PRS positioning occasion. In another particular implementation, the first PRS positioning occasion is the first PRS positioning occasion for the reference cell following subframe zero of system frame number zero and the second PRS positioning occasion is the first PRS positioning occasion for a position occasion group for the identified PRS configuration with a longest periodicity for the neighboring cell, wherein the position occasion group immediately follows the first PRS positioning occasion. In another particular implementation, the offset parameter comprises a subframe offset. In another particular implementation, the identified PRS configuration for the neighboring cell with a longest periodicity uses frequency hopping and wherein the offset parameter further comprises an indication of a frequency band for the second PRS positioning occasion. In another particular implementation, the server further comprises means for receiving a second message from the mobile device comprising a Reference Signal Time Difference (RSTD) measurement for the neighboring cell. In another particular implementation, the first message is an LTE Positioning Protocol (LPP) Provide Assistance Data message. In another particular implementation, the second message is an LPP Provide Location information message. In another particular implementation, the location server is an Enhanced Serving Mobile Location Center (E-SMLC) or a Secure User Plane Location (SUPL) Location Platform (SLP).

Other particular embodiments described herein are directed to a server device, comprising: a communication interface to transmit messages to and receive messages from a communication network; and one or more processors configured to: determine a reference cell and a neighboring cell to transmit PRS positioning occasions to be acquired by a client mobile device for positioning operations, the neighboring cell being configured to transmit PRS positioning occasions according to two or more PRS configurations; identify a PRS configuration of the two or more PRS configurations transmitting PRS positioning occasions with a longest periodicity; and initiate transmission of a first message through the communication interface to the client mobile device comprising an offset parameter indicative of a difference in timing between transmission of a first PRS positioning occasion from a first eNodeB of the reference cell and transmission of a second PRS positioning occasion from a second eNodeB of the neighboring cell transmitted according to the PRS positioning configuration identified as transmitting the PRS positioning occasions with a longest periodicity, wherein the client mobile device is capable of determining timing of PRS positioning occasions transmitted according to at least one of the two or more PRS configurations based, at least in part, on the difference in timing between transmission of the first PRS positioning occasion and transmission of the second PRS positioning occasion. In one example implementation, the longest periodicity comprises the longest periodicity between consecutive PRS positioning occasions. In another example implementation, each of the two or more PRS configurations for the neighboring cell comprise PRS occasion groups and wherein the longest periodicity comprises the longest PRS occasion group periodicity. In another particular implementation, the neighboring cell and reference cell use different frequency bands. In another particular implementation, at least one of the two or more PRS configurations for the neighboring cell uses frequency hopping and wherein the periodicity between consecutive PRS positioning occasions for the at least one of the two or more PRS configurations for the neighboring cell comprises the periodicity between consecutive PRS positioning occasions that use the same frequency. In another particular implementation, at least one of the two or more PRS configurations for the neighboring cell uses frequency hopping over a number N of frequency bands and wherein the PRS occasion group length for the at least one of the two or more PRS configurations for the neighboring cell is equal to or greater than the number N. In another particular implementation, the first PRS positioning occasion is the first PRS positioning occasion for the reference cell following subframe zero of system frame number zero and the second PRS positioning occasions is the PRS positioning occasion for the identified PRS configuration with a longest periodicity for the neighboring cell which immediately follows the first PRS positioning occasion. In another particular implementation, the first PRS positioning occasion is the first PRS positioning occasion for the reference cell following subframe zero of system frame number zero and the second PRS positioning occasion is the first PRS positioning occasion for a position occasion group for the identified PRS configuration with a longest periodicity for the neighboring cell, wherein the position occasion group immediately follows the first PRS positioning occasion. In another particular implementation, the offset parameter comprises a subframe offset. In another particular implementation, the identified PRS configuration for the neighboring cell with a longest periodicity uses frequency hopping and wherein the offset parameter further comprises an indication of a frequency band for the second PRS positioning occasion. In another particular implementation, the one or more processors are further configured to obtain a second message received at the communication interface from the mobile device comprising a Reference Signal Time Difference (RSTD) measurement for the neighboring cell. In another particular implementation, the first message is an LTE Positioning Protocol (LPP) Provide Assistance Data message. In another particular implementation, the second message is an LPP Provide Location information message. In another particular implementation, the location server is an Enhanced Serving Mobile Location Center (E-SMLC) or a Secure User Plane Location (SUPL) Location Platform (SLP).

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a mobile device, for supporting positioning of the mobile device, comprising:
    receiving assistance data from a location server including an offset parameter based on a first Positioning Reference Signal (PRS) subframe of a first PRS configuration for transmission of PRS positioning occasions by a reference cell on a reference carrier frequency layer and a first PRS subframe in a closest subsequent PRS occasion group of a first PRS configuration for transmission of PRS positioning occasions by a neighbor cell on a different carrier frequency layer, wherein the first PRS configuration for transmission of PRS positioning occasions by the neighbor cell has a longest periodicity between consecutive PRS positioning occasions transmitted by the neighbor cell;
    determining an expected timing of one or more PRS positioning occasions of a second PRS configuration on the neighbor cell based on the offset parameter; and
    measuring a Reference Signal Time Difference (RSTD) for the neighbor cell based at least in part on the expected timing.

2. The method of claim 1, wherein the first PRS configuration for transmission of PRS positioning occasions by the neighbor cell uses frequency hopping.

3. The method of claim 2, wherein frequency hopping includes over a number N of frequency bands and wherein a PRS occasion group length for the first PRS configuration is equal to or greater than the number N.

4. The method of claim 1, wherein the offset parameter comprises a subframe offset.

5. The method of claim 1, further comprising sending a second message to the location server, wherein the second message comprises the RSTD.

6. The method of claim 5, wherein the second message is an LPP Provide Location information message.

7. The method of claim 1, wherein the assistance data is an LTE Positioning Protocol (LPP) Provide Assistance Data message.

8. The method of claim 1, wherein the location server is an Enhanced Serving Mobile Location Center (E-SMLC) or a Secure User Plane Location (SUPL) Location Platform (SLP).

9. The method of claim 1, wherein the method supports location services with Long Term Evolution (LTE) or Narrow Band Internet of Things (NB-IoT) wireless access.

10. An apparatus, comprising:
    a memory;
    at least one transceiver;
    at least one processor communicatively coupled to the memory and the at least one transceiver, and configured to:
        receive assistance data from a location server including an offset parameter based on a first Positioning Reference Signal (PRS) subframe of a first PRS configuration for transmission of PRS positioning occasions by a reference cell on a reference carrier frequency layer and a first PRS subframe in a closest subsequent PRS occasion group of a first PRS configuration for transmission of PRS positioning occasions by a neighbor cell on a different carrier frequency layer, wherein the first PRS configuration for transmission of PRS positioning occasions by the neighbor cell has a longest periodicity between consecutive PRS positioning occasions transmitted by the neighbor cell;

determine an expected timing of one or more PRS positioning occasions of a second PRS configuration on the neighbor cell based on the offset parameter; and measure a Reference Signal Time Difference (RSTD) for the neighbor cell based at least in part on the expected timing.

11. The apparatus claim 10, wherein the first PRS configuration for transmission of PRS positioning occasions by the neighbor cell uses frequency hopping.

12. The apparatus of claim 11, wherein frequency hopping includes over a number N of frequency bands and wherein a PRS occasion group length for the first PRS configuration is equal to or greater than the number N.

13. The apparatus of claim 10, wherein the offset parameter comprises a subframe offset.

14. The apparatus of claim 10, wherein the at least one processor is further configured to send the measured RSTD in a second message to the location server.

15. The apparatus of claim 14, wherein the second message is an LPP Provide Location information message.

16. The apparatus of claim 10, wherein the assistance data is an LTE Positioning Protocol (LPP) Provide Assistance Data message.

17. The apparatus of claim 10, wherein the location server is an Enhanced Serving Mobile Location Center (E-SMLC) or a Secure User Plane Location (SUPL) Location Platform (SLP).

18. The apparatus of claim 10, wherein the at least one processor and the at least one transceiver are configured to support location services with Long Term Evolution (LTE) or Narrow Band Internet of Things (NB-IoT) wireless access.

19. An apparatus for supporting positioning of a mobile device, comprising:

means for receiving assistance data from a location server including an offset parameter based on a first Positioning Reference Signal (PRS) subframe of a first PRS configuration for transmission of PRS positioning occasions by a reference cell on a reference carrier frequency layer and a first PRS subframe in a closest subsequent PRS occasion group of a first PRS configuration for transmission of PRS positioning occasions by a neighbor cell on a different carrier frequency layer, wherein the first PRS configuration for transmission of PRS positioning occasions by the neighbor cell has a longest periodicity between consecutive PRS positioning occasions transmitted by the neighbor cell;

means for determining an expected timing of one or more PRS positioning occasions of a second PRS configuration on the neighbor cell based on the offset parameter; and means for measuring a Reference Signal Time Difference (RSTD) for the neighbor cell based at least in part on the expected timing.

20. The apparatus of claim 19, wherein the first PRS configuration for transmission of PRS positioning occasions by the neighbor cell uses frequency hopping.

21. The apparatus of claim 20, wherein frequency hopping includes over a number N of frequency bands and wherein a PRS occasion group length for the first PRS configuration is equal to or greater than the number N.

22. The method of claim 19, wherein the offset parameter comprises a subframe offset.

23. A non-transitory processor-readable storage medium comprising processor-readable instructions to cause one or more processors to support positioning of a mobile device, comprising:

code for receiving assistance data from a location server including an offset parameter based on a first Positioning Reference Signal (PRS) subframe of a first PRS configuration for transmission of PRS positioning occasions by a reference cell on a reference carrier frequency layer and a first PRS subframe in a closest subsequent PRS occasion group of a first PRS configuration for transmission of PRS positioning occasions by a neighbor cell on a different carrier frequency layer, wherein the first PRS configuration for transmission of PRS positioning occasions by the neighbor cell has a longest periodicity between consecutive PRS positioning occasions transmitted by the neighbor cell;

code for determining an expected timing of one or more PRS positioning occasions of a second PRS configuration on the neighbor cell based on the offset parameter; and code for measuring a Reference Signal Time Difference (RSTD) for the neighbor cell based at least in part on the expected timing.

24. The non-transitory processor-readable storage medium of claim 23, wherein the first PRS configuration for transmission of PRS positioning occasions by the neighbor cell uses frequency hopping.

25. The non-transitory processor-readable storage medium of claim 24, wherein frequency hopping includes over a number N of frequency bands and wherein a PRS occasion group length for the first PRS configuration is equal to or greater than the number N.

26. The non-transitory processor-readable storage medium of claim 23, wherein the offset parameter comprises a subframe offset.

* * * * *